(12) United States Patent
Kato et al.

(10) Patent No.: US 7,016,137 B2
(45) Date of Patent: Mar. 21, 2006

(54) TAPE DRIVE APPARATUS, RECORDING AND/OR REPRODUCING METHOD, AND RECORDING MEDIUM

(75) Inventors: Tatsuya Kato, Kanagawa (JP); Masaki Yoshida, Tokyo (JP); Katsumi Ikeda, Kanagawa (JP); Yoshihisa Takayama, Kanagawa (JP)

(73) Assignee: Sony Corporation, (JP)

( * ) Notice: Subject to any disclaimer, the term of this patent is extended or adjusted under 35 U.S.C. 154(b) by 234 days.

(21) Appl. No.: 10/748,155

(22) Filed: Dec. 31, 2003

(65) Prior Publication Data

US 2005/0018342 A1    Jan. 27, 2005

(30) Foreign Application Priority Data

Jan. 7, 2003    (JP)    ............ P2003-001006

(51) Int. Cl.
G11B 19/02    (2006.01)
G11B 23/02    (2006.01)

(52) U.S. Cl. ..................... 360/69; 360/132
(58) Field of Classification Search .......... None
See application file for complete search history.

(56) References Cited

U.S. PATENT DOCUMENTS

| | | | |
|---|---|---|---|
| 6,624,961 B1* | 9/2003 | Takayama | 360/72.3 |
| 2004/0165314 A1* | 8/2004 | Fujiwara et al. | 360/133 |
| 2004/0194151 A1* | 9/2004 | Earhart | 725/135 |

FOREIGN PATENT DOCUMENTS

JP    09-237474    9/1996

* cited by examiner

Primary Examiner—Andrew L. Sniezek
(74) Attorney, Agent, or Firm—Rader, Fishman & Grauer PPLC; Ronald P. Kananen

(57) ABSTRACT

A tape cassette of this invention is equipped with a memory capable of accommodating management information. The memory retains an MIC logical format type designating a format state, either formatted or unformatted, of the magnetic tape. A check is made on the consistency between the format state designated by the MIC logical format type and the format state estimated by reading data from the magnetic tape. If an inconsistency is detected, that is interpreted to mean that the tape cassette has been tampered with, and read and write operations on the cassette are controlled accordingly. This enhances security against fraudulent uses of a tape drive system loaded with the tape cassette.

5 Claims, 15 Drawing Sheets

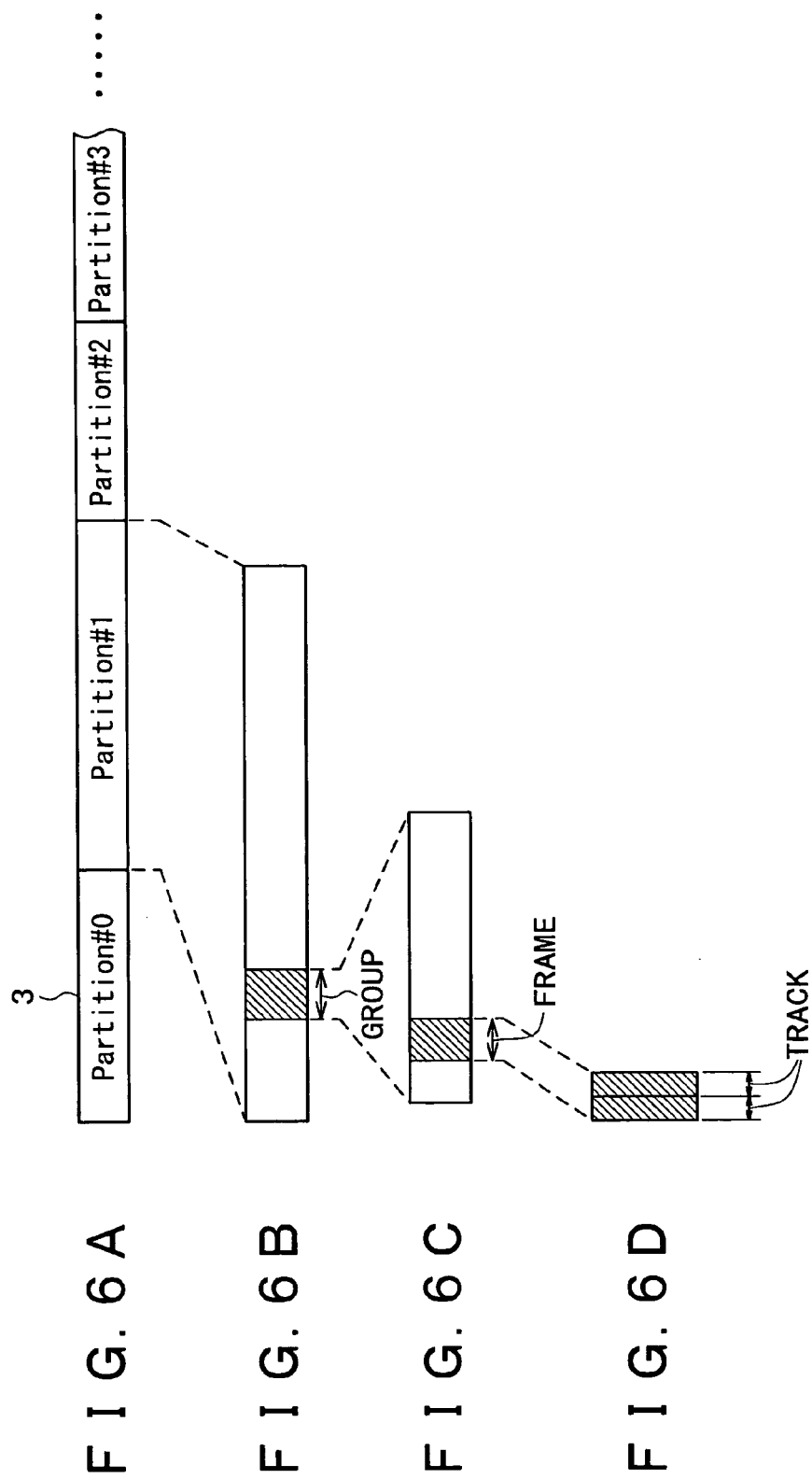

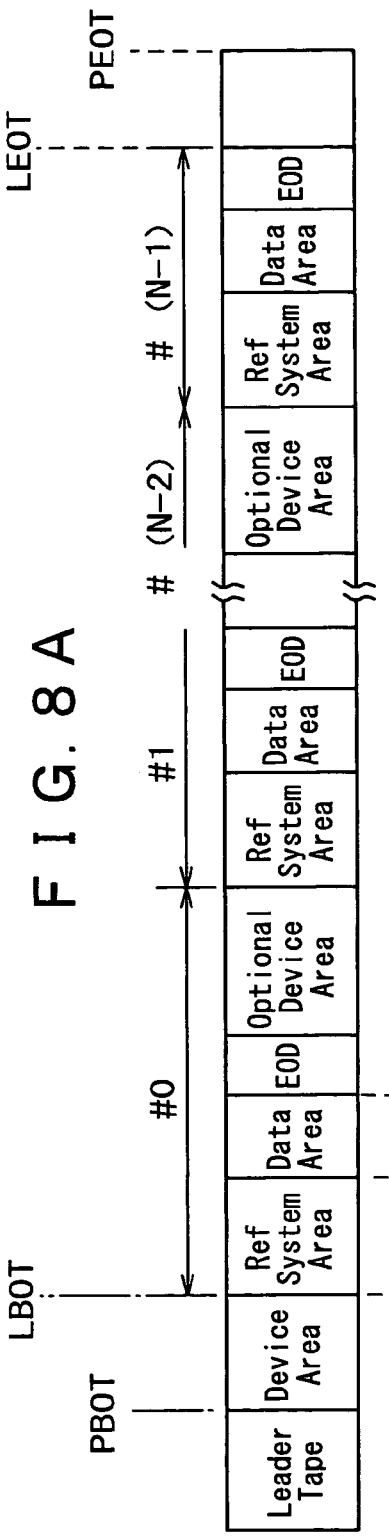
F I G. 8A
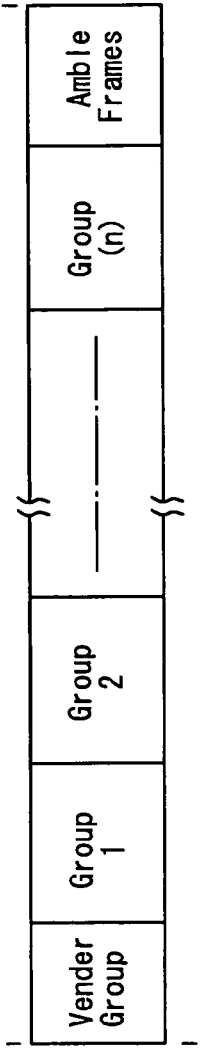
F I G. 8B
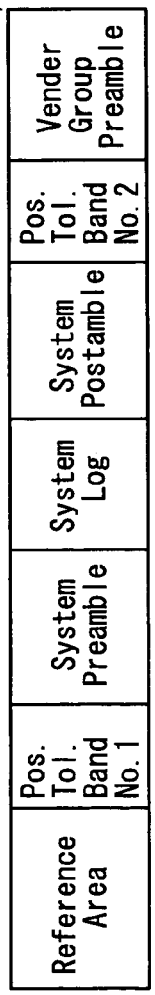
F I G. 8C

FIG. 10

| Manufacture Part | | |
|---|---|---|
| | manufacture part checksum | 1byte |
| | mic type | 1byte |
| | mic manufacture date | 4bytes |
| | mic manufacture line name | 8bytes |
| | mic manufacture plant name | 8bytes |
| | mic manufacturer name | 8bytes |
| | mic name | 8bytes |
| | cassette manufactured date | 4bytes |
| | cassette manufacturer line name | 8bytes |
| | cassette manufacturer plant name | 8bytes |
| | cassette manufacturer name | 8bytes |
| | cassette name | 8bytes |
| | oem customer name | 8bytes |
| | physical tape characteristic ID | 2bytes |
| | maximum clock frequency | 2bytes |
| | block size | 1byte |
| | mic capacity | 1byte |
| | write protect top address | 2bytes |
| | write protect count | 2bytes |
| | reserved | 1byte |
| | application ID | 1byte |
| | offset | 2bytes |

FIG. 11

| Drive Initialize Part | |
|---|---|
| Drive Initialize Part Checksum | 1 byte |
| MIC Logical Format Type | 1 byte |
| Super high speed search map Pointer | 2 bytes |
| User Volume Note Cell Pointer | 2 bytes |
| User Partition Note Cell Pointer | 2 bytes |
| Partition Information Cell Pointer | 2 bytes |
| Reserved | 1 byte |
| Volume Attribute Flags | 1 byte |
| Free Pool Top Address | 2 bytes |
| Free Pool Bottom Address | 2 bytes |

FIG. 12

| Value | Definition |
|---|---|
| 0 | AIT-1 Virgin MIC |
| 1 | AIT-1 Basic MIC Logical Format Type 1 |
| 2 to 9 | Reserved |
| 10 | AIT-2 Virgin MIC |
| 11 | AIT-2 Basic MIC Logical Format Type 1 |
| 12 to 13 | Reserved |
| 14 | AIT-2 Virgin Remote MIC |
| 15 | AIT-2 Basic Remote MIC Logical Format Type 1 |
| 16 to 19 | Reserved |
| 20 | AIT-3 Virgin Remote MIC |
| 21 | AIT-3 Basic Remote MIC Logical Format Type 1 |
| 22 to 255 | Reserved |

FIG. 14

| | | |
|---|---|---|
| 1 to 48 | Partition N Information | 48 Bytes |
| 49 to 96 | Partition N Information | 48 Bytes |
| ... | ... | ... |
| 24,528 to 24,576 | Partition N Information | 48 Bytes | 24,576 Bytes = 48 Bytes * 512 |
| 24,577 to 24,578 | System Log Vendor Data Type Number | 2 Bytes |
| 24,579 to 66,816 | System Log Vendor Data | 42,238 Bytes |

Rows 1 through 24,576 = Partition Information. Total = 66,816 Bytes.

System Log with Vendor Data information (Type 1)

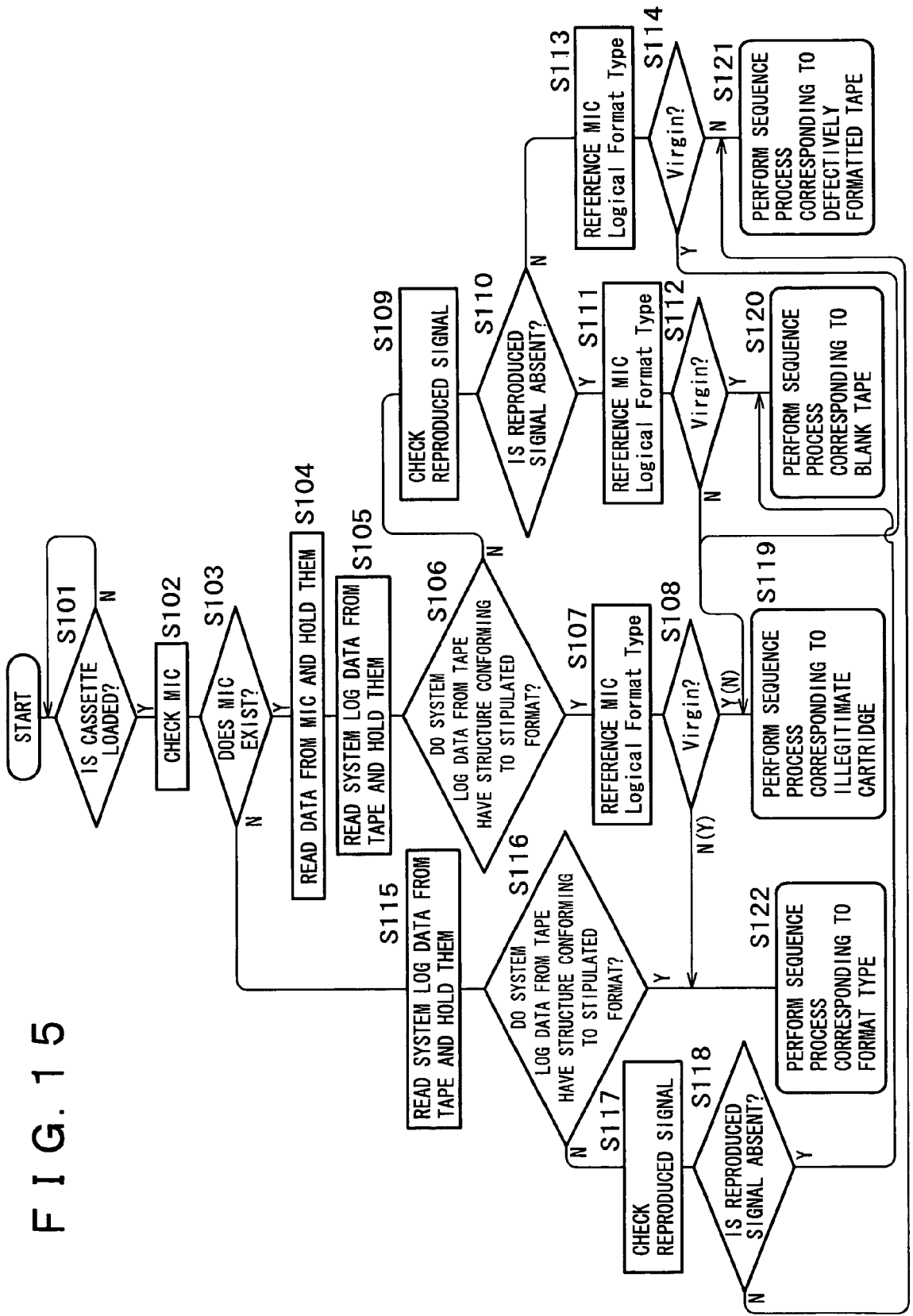
F I G. 15

TAPE DRIVE APPARATUS, RECORDING AND/OR REPRODUCING METHOD, AND RECORDING MEDIUM

BACKGROUND OF THE INVENTION

The present invention relates to a recording medium in the form of a tape cassette containing a magnetic tape, a tape drive apparatus capable of recording and/or reproducing information to and/or from the tape cassette, and a recording and/or reproducing method for use with the tape drive apparatus.

Tape streamer drives are a well-known drive apparatus for recording and reproducing digital data to and from a magnetic tape serving as a recording medium held in a tape cassette. Depending on the tape length of the tape cassette they use, some tape streamer drives can record large quantities of data amounting to tens to hundreds of gigabytes. Their mass storage capability allows the tape streamer drives to be utilized extensively in diverse applications including the backup of data recorded illustratively on hard discs in the computer body and the storage of picture data and other massive data.

In a data storage system made up of such a tape streamer drive and a tape cassette containing a magnetic tape, management information or the like is needed for the drive to manage appropriately its recording and/or reproduction of data to and/or from the magnetic tape. The management information includes information about diverse locations on the magnetic tape as well as a use history of the tape.

A management information area is located at the beginning of the magnetic tape or at the beginning of each of the partitions formed along the tape. Before writing or reproducing data to or from the magnetic tape, the tape streamer drive gains access to the management information area to read necessary management information therefrom. Based on the management information thus retrieved, the tape streamer drive performs various processes allowing subsequent recording or reproducing operations to proceed appropriately.

At the end of the data recording or reproduction of data, the tape streamer drive again accesses the management information area to update the relevant information therein in a manner reflecting any changes resulting from the preceding recording or reproducing operation. The updates are carried out to prepare for the next recording or reproducing operation. Thereafter, the tape cassette is unloaded and ejected from the tape streamer drive.

Where recording and/or reproduction is performed on the basis of such management information, the tape streamer drive is required twice to access the management information area at the beginning of the magnetic tape or of one of its partitions, first, before the operation is started, and later, when the operation has ended, so that the relevant data should be written to and read from the area each time. In other words, the tape cassette cannot be loaded or unloaded halfway through the recording or reproducing operation along the magnetic tape.

Upon access to the management information area, the tape streamer drive is required physically to feed the magnetic tape. That means it takes some time to access the beginning of the magnetic tape or of one of its partitions. In particular, if the recording or reproducing operation on the magnetic tape ends at a considerable physical distance from the management information area, it takes a correspondingly long time to feed the tape before the target area can be reached.

As described, data storage systems that utilize tape cassettes as their recording media require a relatively long access time before a single write or read operation is completed, i.e., from the time the magnetic tape was loaded until it is unloaded. It is obviously preferable to minimize the time required for such a series of access-related operations.

For that purpose, techniques have been proposed whereby a nonvolatile memory is installed within a tape cassette enclosure so that the memory may accommodate management information (refer illustratively to Japanese Patent Laid-open No. Hei 9-237474). The tape streamer drive for use with such a memory-equipped tape cassette incorporates an interface for writing and reading management information to and from the nonvolatile memory, i.e., information about the recording and reproduction of data to and from the magnetic tape.

The above arrangement eliminates the need illustratively to rewind the magnetic tape at the time of loading or unloading the cassette. That is, the tape cassette may be loaded or unloaded halfway through the ongoing operation along the tape.

As described, the nonvolatile memory is attached to the tape cassette to shorten access time and gain other benefits. As long as the tape cassette is normally used, the content of data placed in the nonvolatile memory is generally kept consistent with the initial purpose of the tape cassette and with its past history of write and read operations made thereto and therefrom.

Typically, the above-described nonvolatile memory for the tape cassette is secured mechanically inside the cassette enclosure. That means it is impossible to exclude the possibility that the initially installed nonvolatile memory might be removed from within the enclosure and replaced by an illicit nonvolatile memory.

Described below is a concrete example of how the tape cassette can be tampered with. In addition to the normal-type tape cassette for normal data storage, there have been developed and marketed tape cassettes intended for special uses. A tape cassette for one of such special uses is illustratively designed to have a magnetic tape to which data can be recorded only once. Once recorded on the tape, the data can only be read and cannot be overwritten. This tape cassette feature is called WORM (Write Once Read Many). The WORM feature is also provided to disc type recording media such as CD-Rs and DVD-Rs.

On a WORM tape cassette, data can only be read from the data-recorded areas and no data can be written thereto. History information about the read and other operations on the tape cannot be updated in a manner causing any management information area associated with the recorded areas to reflect the past changes. Such history information can only be written to the nonvolatile memory in the tape cassette. Therefore, the management information that needs to be consistent with the WORM tape cassette is always stored into its nonvolatile memory. Where the WORM tape cassette is subject to the recording and/or reproduction of data, it is mandatory to use the management information held in the nonvolatile memory of the cassette and not any management information recorded on the magnetic tape.

Suppose now that a malicious user has illicitly replaced the original nonvolatile memory of the WORM tape cassette and that the memory does not contain any information designating the WORM feature but information designating only a normal type tape cassette. In that case, the tape cassette originally designed to provide the WORM feature will be recognized as a normal type tape cassette if the designating information in the nonvolatile memory is referenced as the basis for the recognition. This will enable attempts to write data even to the recorded areas on the tape. That is, data can be falsified or otherwise corrupted on the tape in the cartridge.

Illustratively, WORM tape cassettes are actually utilized most often for the recording of important data that call for secure measures to maintain their high storage value, given the premise that recorded data can only be read and neither overwritten nor erased. Hence high levels of security are demanded by and offered to the data accommodated by the WORM tape cassette, so that the data will not be destroyed or falsified on the magnetic tape inside.

The fraudulent case above involving the WORM tape cassette is but one example of tape cassette tampering. Regardless of their intended purposes, nonvolatile memory-equipped tape cassettes could have their data destroyed or corrupted on the magnetic tape if their memories were illicitly replaced.

In actually marketing nonvolatile memory-equipped tape cassettes, tape cassette vendors are required to provide a scheme for preventing cases of tampering such as illegal replacement of the nonvolatile-memory.

SUMMARY OF THE INVENTION

In solving the foregoing and other problems of the related art and according to one aspect of the invention, there is provided a tape drive apparatus including a tape-oriented recording and/or reproducing element for recording and/or reproducing information to and/or from a magnetic tape housed in a tape cassette furnished as a recording medium, the tape cassette being loaded in the apparatus, a memory accessing element for accessing a memory which is incorporated in the tape cassette furnished as the recording medium and which holds management information for write and/or read operations to and/or from the magnetic tape, the memory accessing element writing and/or reading information to and/or from the memory following the accessing, an information acquiring element for acquiring format state designation information from the memory by causing the memory accessing element to access the memory for information retrieval, the format state designation information designating an unformatted state when the magnetic tape has yet to be formatted, and the format state designation information further designating a formatted state once the magnetic tape is formatted, and an operation controlling element which, based at least on specifics of the acquired format state designation information and on a result of a read operation on the magnetic tape by the tape-oriented recording and/or reproducing element, controls a write and/or a read operation on the recording medium.

According to another aspect of the invention, there is provided a recording and/or reproducing method for use with a tape drive apparatus. The method including the steps of recording and/or reproducing information to and/or from a magnetic tape housed in a tape cassette furnished as a recording medium, the tape cassette being loaded in the apparatus, accessing a memory which is incorporated in the tape cassette furnished as the recording medium and which holds management information for write and/or read operations to and/or from the magnetic tape, the memory accessing step writing and/or reading information to and/or from the memory following the accessing, acquiring format state designation information from the memory by causing the memory accessing step to access the memory for information retrieval, the format state designation information designating an unformatted state when the magnetic tape has yet to be formatted, and the format state designation information further designating a formatted state once the magnetic tape is formatted, and controlling a write and/or a read operation on the recording medium based at least on specifics of the acquired format state designation information and on a result of a read operation on the magnetic tape performed in the recording and/or reproducing step.

According to a further aspect of the invention, there is provided a recording medium furnished as a tape cassette in a cartridge for housing a magnetic tape to and/or from which to write and/or read information and a memory for holding management information for managing write and/or read operations to and/or from the magnetic tape. The memory accommodates format state designation information designating an unformatted state when the magnetic tape has yet to be formatted. The format state designation information further designates a formatted state once the magnetic tape is formatted.

The above-described apparatus and method of the invention are used in combination with the inventive recording medium that is a tape cassette housing a magnetic tape and equipped with a memory which holds management information for managing the writing and reading of information to and from the magnetic tape.

The memory retains as a piece of management information the format state designation information designating an unformatted state when the magnetic tape has yet to be formatted and a formatted state once the magnetic tape is formatted. Write and read operations to and from the loaded tape cassette are controlled by referring to the format state designation information read from the memory and in reference to a result of a read operation performed on the magnetic tape.

When references are made to the format state designation information from the memory as well as to the result of the read operation on the magnetic tape, that is equivalent to verifying whether there is a match between the magnetic tape format state designated by the format state designation information on the one hand, and the actual format state detected from the magnetic tape on the other hand. In case of a mismatch, it is possible to surmise that the tape cassette has been tampered with.

BRIEF DESCRIPTION OF THE DRAWINGS

Further objects and advantages of this invention will become apparent upon a reading of the following description and appended drawings in which:

FIGS. 6A, 6B, 6C and 6D are explanatory views showing a structure of data recorded on a magnetic tape;

FIGS. 8A, 8B and 8C are explanatory views illustrating an area structure on a magnetic tape;

FIG. 10 is an explanatory view presenting a manufacture part of the MIC data structure according to the invention;

FIG. 11 is an explanatory view describing a drive initialize part of the MIC data structure according to the invention;

FIG. 12 is an explanatory view listing definitions of an MIC logical format type according to the invention;

FIG. 14 is an explanatory view showing another typical system log according to the invention; and FIG. 15 is a flowchart of steps constituting an illegitimate cartridge handling process embodying the invention.

DETAILED DESCRIPTION OF THE PREFERRED EMBODIMENTS

Preferred embodiments of this invention will now be described with reference to the accompanying drawings. This applicant proposed in the past a number of inventions regarding a nonvolatile, memory-equipped tape cassette and a tape drive apparatus (tape streamer drive) capable of recording and reproducing digital data to and from the memory-equipped tape cassette. This invention submitted by the same applicant applies to improvements of the memory-equipped tape cassette and tape streamer drive. The nonvolatile memory attached to the tape cassette according to the invention may be called an MIC (memory in cassette). The description below will be made under the following headings:

1. Structure of the tape cassette;
2. Structure of the remote memory chip;
3. Structure of the tape streamer drive;
4. Magnetic tape format;
5. MIC data structure;
6. Data structure of system logs on the magnetic tape; and
7. Fraud preventing measures;

1. Structure of the Tape Cassette

Figure 3A:
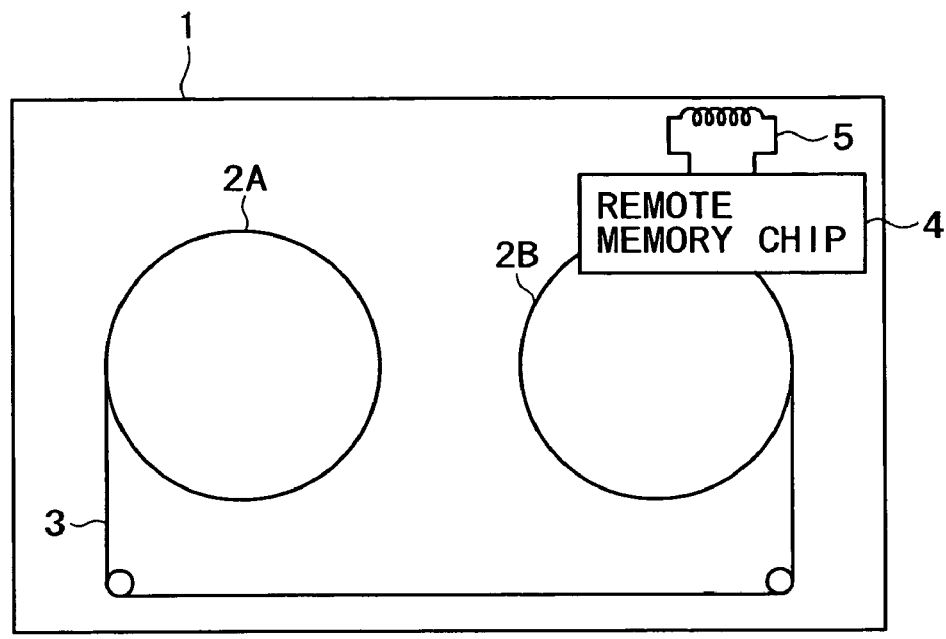
FIGS. 3A and 3B are explanatory views outlining an internal structure of a tape cassette embodying the invention.

The tape cassette for use with the tape streamer drive of this invention is described below with reference to FIGS. 3A, 3B and 4. FIG. 3A conceptually depicts an internal structure of a tape cassette equipped with a remote memory chip. Inside the tape cassette 1 are reels 2A and 2B, as illustrated, and a magnetic tape 3 with a tape width of 8 mm is wound around the reels.

The tape cassette 1 contains the remote memory chip 4 incorporating a nonvolatile memory and its control circuits. The remote memory chip 4 is furnished with an antenna 5 that allows the chip 4 to communicate data wirelessly with a remote memory interface 30 of the tape streamer drive, to be discussed later.

The remote memory chip 4 accommodates diverse items of information about each tape cassette, i.e., manufacture information, serial number information, tape thickness, tape length, tape material, history of past uses of recorded data in each of the partitions formed along the tape, and user information. These items of information will be described later in more detail. In this specification, the diverse kinds of information held in the remote memory chip 4 are collectively called "management information" because they are used primarily in managing the writing and reading of data to and from the magnetic tape 3.

As outlined above, the nonvolatile memory housed in the tape cassette enclosure stores management information, and the tape streamer drive for use with the tape cassette has the interface for writing and reading relevant management information to and from the nonvolatile memory in connection with write and read operations of data to and from the magnetic tape. This setup permits efficient data recording and reproduction to and from the magnetic tape 3.

Illustratively, the magnetic tape does not need to be rewound to the tape top upon loading or unloading of the tape cassette. That is, the tape cassette can be loaded or unloaded halfway through the ongoing operation. Data may be edited by updating the management information in the nonvolatile memory as needed. Furthermore, it is easy to form a large number of partitions along the tape and manage them appropriately.

If the tape cassette is designed for some special use, the internal nonvolatile memory inside is arranged to accommodate, as part of management information, use type information representative of the specific use. This arrangement eliminates the need illustratively to form identification holes on the tape cassette enclosure for use identification purposes. Size constraints of the tape cassette enclosure put a physical limit on the number of identification holes that may be formed on the enclosure. On the side of the tape streamer drive, it is not feasible to include a mechanical detection facility for detecting each and every identification hole that could be formed; the holes for identifying numerous uses cannot be dealt with physically. By contrast, a large number of tape cassette uses can be recognized if the management information in the nonvolatile memory is arranged to include relevant information representing the use types in effect, as mentioned above.

Figure 3B:
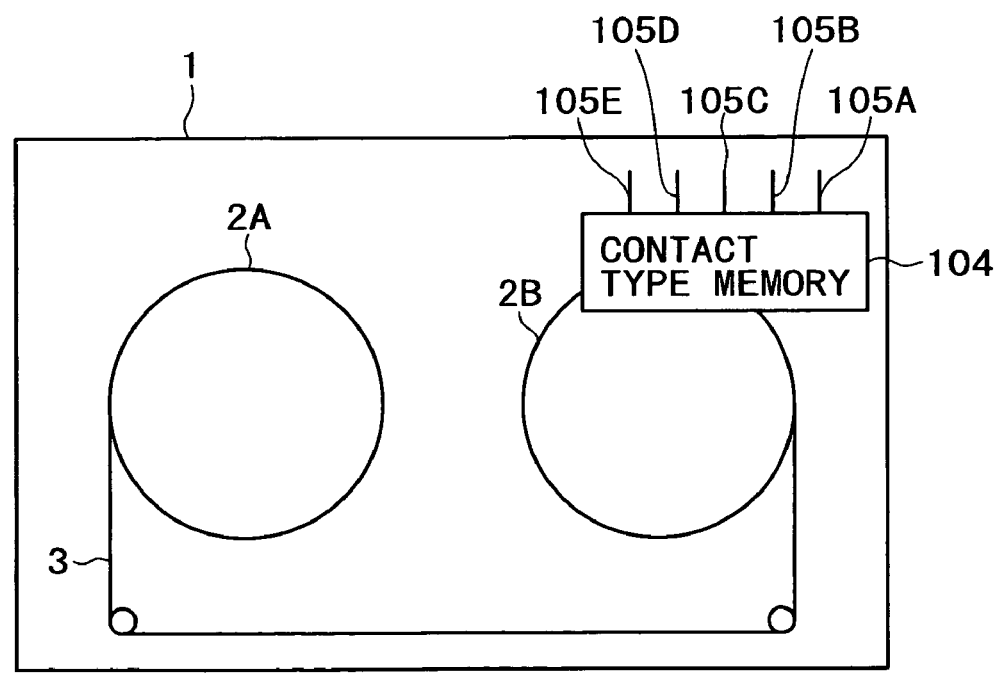

FIG. 3B shows a tape cassette 1 incorporating a contact type memory 104 (nonvolatile memory). In this setup, a module of the contact type memory 104 has five terminals 105A, 105B, 105C, 105D and 105E serving as a power supply terminal, a data input terminal, a clock input terminal, a grounding terminal, and a reserved terminal, respectively. The contact type memory 104 stores the same management information as the remote memory chip 4 described above.

In this specification, the nonvolatile memory housed in the tape cassette is called the MIC, as mentioned above. According to the invention, as can be understood from the above description, there exist two kinds of MIC: a remote memory chip 4; and a contact type memory 104. In the description that follows, the remote memory chip 4 and the contact type memory 104 are collectively called the MIC if there is no specific need to distinguish the two.

Figure 4:
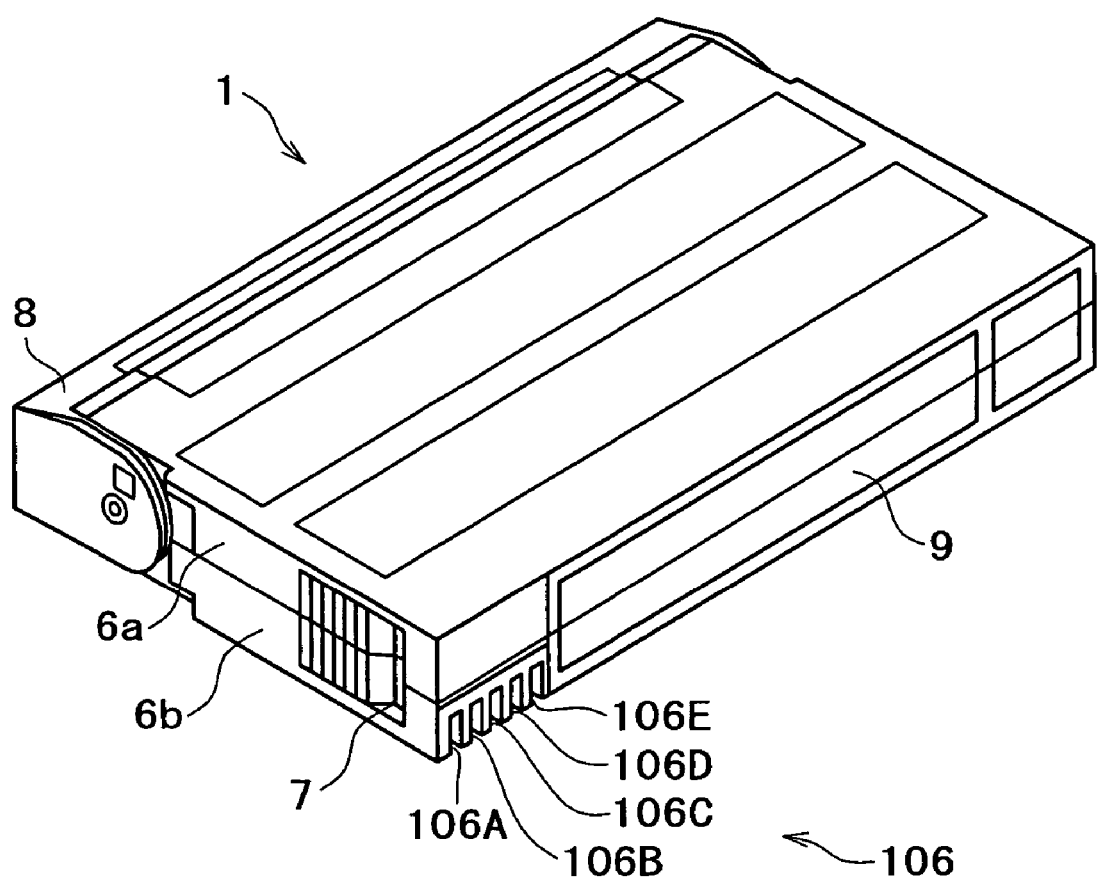
FIG. 4 is a perspective view of the inventive tape cassette.

FIG. 4 depicts an external view of the tape cassette 1 shown in FIG. 3A or 3B. The enclosure as a whole is made up of an upper case 6a, a lower case 6b, and a guard panel 8. The structure is basically the same as that of a tape cassette for use by the ordinary 8-mm VTR.

In proximity to a label face 9 on one side of the tape cassette 1 is a terminal block 106. This is a block that accommodates electrodes of the tape cassette incorporating the contact type memory 104 shown in FIG. 3B. Specifically, the block has terminal pins 106A, 106B, 106C, 106D, and 106E connected respectively to the terminals 105A, 105B, 105C, 105D, and 105E of the memory indicated in FIG. 3B. That is, the tape cassette 1 having the contact type memory 104 exchanges data signals with the tape streamer drive through the terminal pins 106A, 106B, 106C, 106D, and 106E in physical contact with their counterparts of the drive.

Obviously, no terminal pins are needed for the tape cassette having the noncontact remote memory chip 4, as shown in FIG. 3A. Still, the tape cassette has a dummy terminal block 106 to maintain outside shape integrity that ensures compatibility with the tape streamer drive.

Although not shown, a label-like noncontact remote memory chip has been known as part of the related art. The label incorporating a remote memory chip may be attached to a suitable location on the enclosure of the tape cassette 1. When the tape cassette 1 is loaded into the tape streamer drive 10, the remote memory chip pasted on the cassette can communicate with a memory communication block of the drive 10.

2. Structure of the Remote Memory Chip

Figure 5:
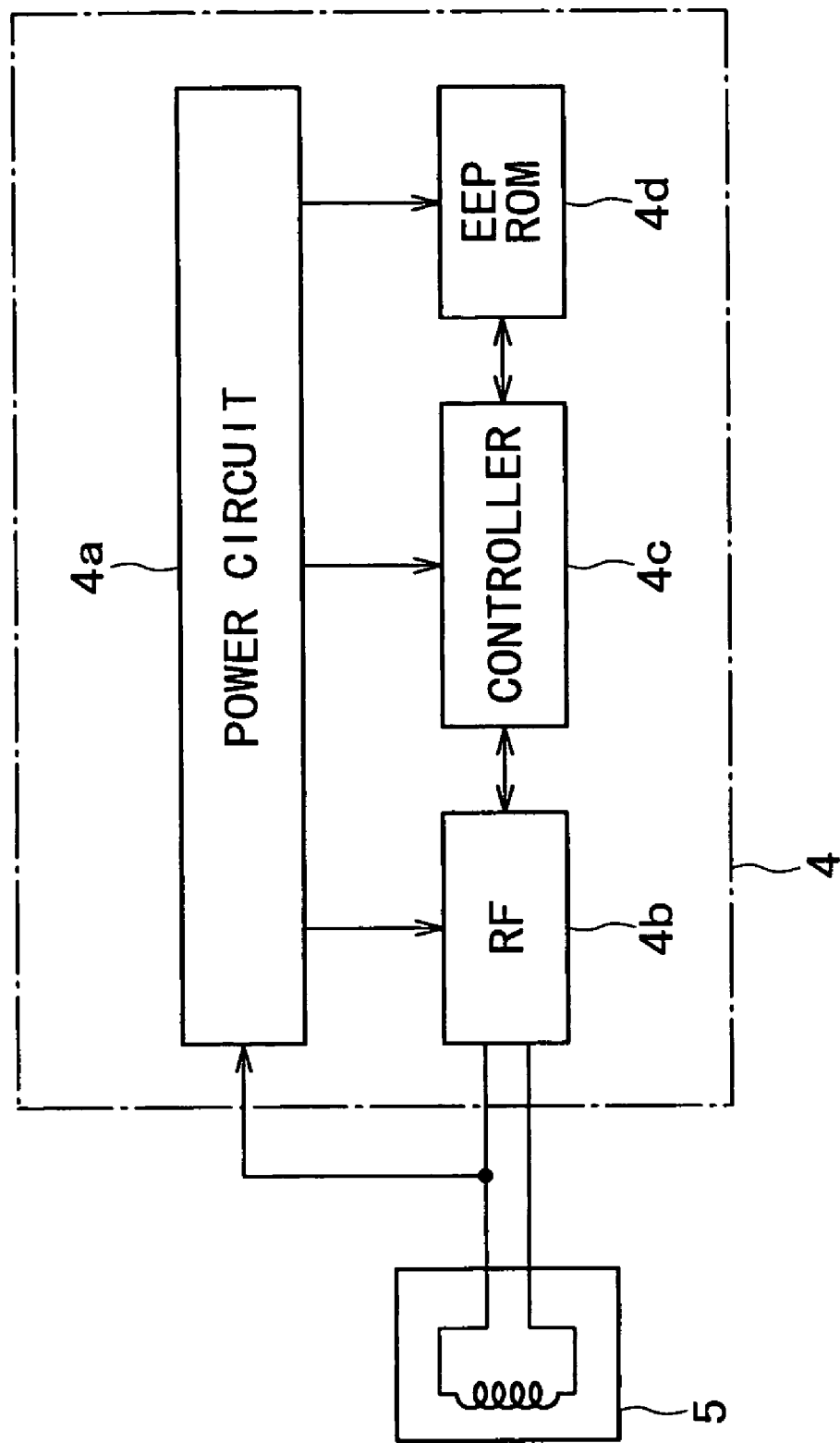
FIG. 5 is a block diagram of a remote memory chip included in the inventive tape cassette.

FIG. 5 shows an internal structure of the remote memory chip 4. Illustratively, the remote memory chip 4 as a semiconductor IC includes a power circuit 4a, a RF processor 4b, a controller 4c, and an EEPROM 4d, as shown in FIG. 5. The remote memory chip 4 is mounted illustratively on a printed circuit board secured inside the tape cassette 1. A copper foil portion of the printed circuit board constitutes the antenna 5.

The remote memory chip 4 is powered from the outside in noncontact fashion. Communication with the tape streamer drive 10, to be described later, utilizes a carrier of, say, 13 MHz. When radio waves from the tape streamer drive 10 are received by the antenna 5, the power circuit 4a converts the 13-MHz carrier into direct currents. The DC power thus generated is supplied to the RF processor 4b, controller 4c, and EEPROM 4d as their operating power.

The RF processor 4b demodulates incoming (received) information and modulates outgoing information. The controller 4c decodes signals received from the RF processor 4b and controls execution of processes reflecting the decoded information (commands), such as write and read operations to and from the EEPROM 4d.

That is, the remote memory chip 4 is switched on upon receipt of radio waves from the tape streamer drive 10 or from a library device 50. The controller 4c executes the processes designated by commands superposed on the carrier, thereby managing data in the EEPROM 4d which is a nonvolatile memory.

3. Structure of the Tape Streamer Drive

Figure 1:
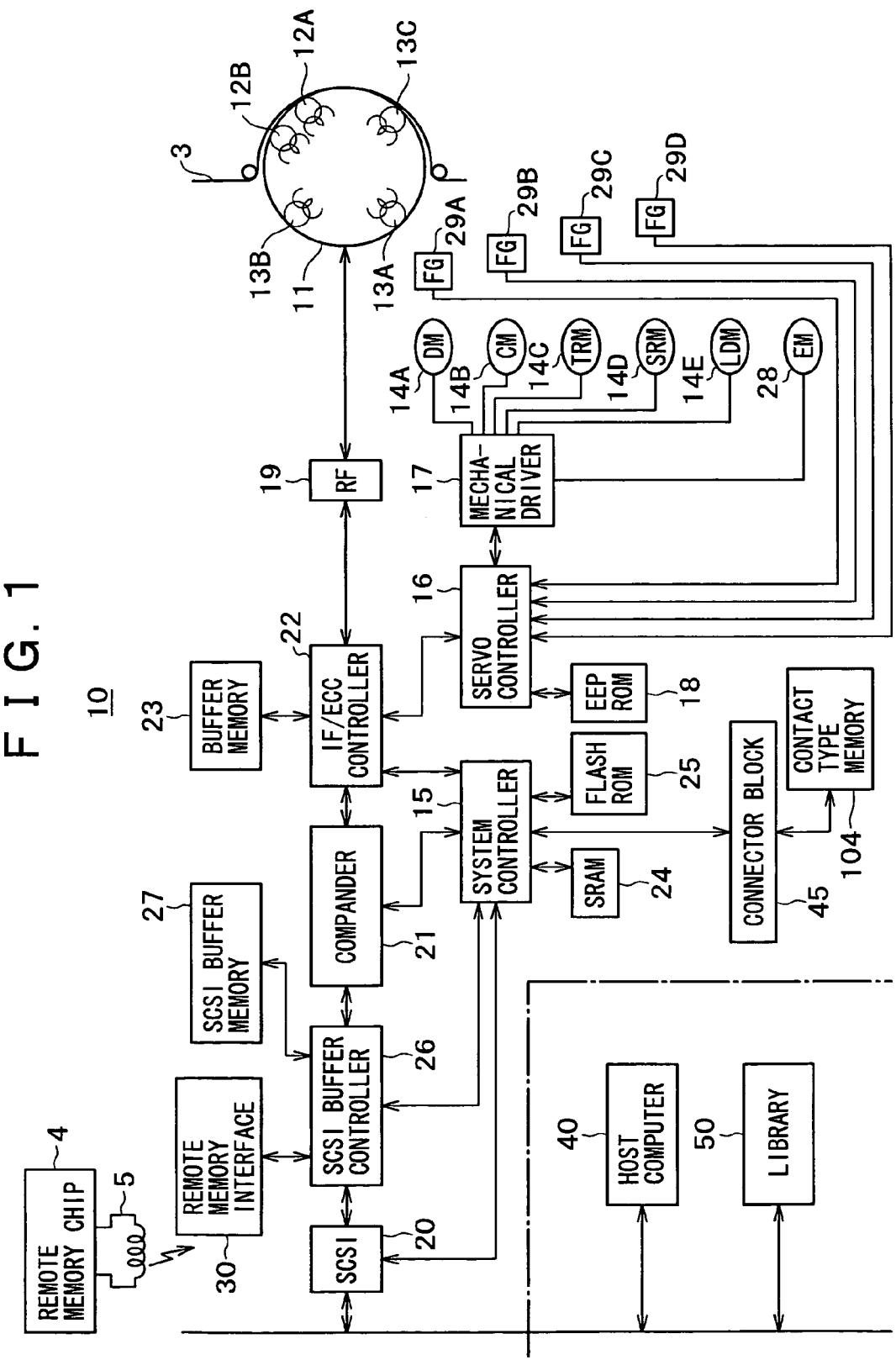
FIG. 1 is block diagram of a tape streamer drive embodying this invention.

Described below with reference to FIG. 1 is a typical structure of the tape streamer drive 10 compatible with the tape cassette 1 equipped with the remote memory chip 4 shown in FIG. 3A. The tape streamer drive 10 operates on the helical scan principle in recording and reproducing data to and from the magnetic tape 3 in the tape cassette 1.

As shown in FIG. 1, a rotary drum 11 illustratively has two write heads 12A and 12B and three read heads 13A, 13B and 13C. The write heads 12A and 12B are structured so that two gaps with different azimuth angles are located in close proximity to each other. The read heads 13A, 13B and 13C are disposed to have their own azimuth angles.

The rotary drum 11 is rotated by a drum motor 14A. The magnetic tape 3 drawn out of the tape cassette 1 is wound around the rotary drum 11, fed by a capstan motor 14B and pinch rollers, not shown. As mentioned above, the magnetic tape 3 is wound around the reels 2A and 2B, which are rotated by reel motors 14C and 14D in forward and backward directions, respectively.

A loading motor 14E drives a loading mechanism, not shown, to load and unload the magnetic tape 3 onto and away from the rotary drum 11. An eject motor 28 drives a tape cassette loading mechanism to load and eject the tape cassette 1.

The drum motor 14A, capstan motor 14B, reel motors 14C and 14D, loading motor 14E, and eject motor 28 are all driven by power fed from a mechanical driver 17. The mechanical driver 17 drives these motors under the control of a servo controller 16. The servo controller 16 controls the rotating speeds of the motors to effect diverse operations: normal tape run for recording or reproduction; tape run for high-speed reproduction; fast forward; and rewind. An EEPROM 18 retains constants and other related data for servo control by the servo controller 16 over the motors.

The drum motor 14A, capstan motor 14B, T reel motor 14C, and S reel motor 14D are each furnished with a frequency generator (FG). These frequency generators detect revolution information about the motors. The detected information is used in servo control by the servo controller 16. More specifically, there are provided a drum FG 29A, a capstan FG 29B, a T reel FG 29C, and an S reel FG 29D for generating frequency pulses in synchronism with the revolutions of the drum motor 14A, capstan motor 14B, T reel motor 14C, and S reel motor 14D, respectively. The generator output (i.e., FG pulses) is fed to the servo controller 16.

Given the FG pulses, the servo controller 16 determines the rotating speed of each of the motors, finds an error between a target rotating speed and the actual rotating speed detected of each motor, and applies power to the mechanical driver 16 in accordance with the detected error in a closed-loop rotating speed control setup. In this manner, the servo controller 16 controls the revolutions of the motors in compliance with their target rotating speeds during such operations as normal tape run for recording or reproduction, high-speed search, fast forward, and rewind.

The servo controller 16 is connected bidirectionally with a system controller 15 that controls the system as a whole through an interface controller/ECC formatter 22 (called the IF/ECC controller hereunder).

The tape streamer drive 10 uses a SCSI interface 20 for data input and output. At the time of data recording, for example, data are input consecutively from a host computer 40 through the SCSI interface 20 in data units of a fixed-length record. The input data are sent to a compander (compressor/expander) 21 via a SCSI buffer controller 26 that controls the SCSI interface 20 in data transfers. A SCSI buffer memory 27 is provided as buffering means used by the SCSI buffer controller 26 in causing the SCSI interface 20 to attain necessary transfer rates. The SCSI buffer controller 26 supplies relevant command data to the remote memory interface 30, to be described later, and generates a clock signal for the interface 30 during operation.

This tape streamer drive system also has a mode in which the host computer 40 transmits data in units of a variable collective data length.

The compander 21 compresses input data as needed in a predetermined format. Illustratively, where LZW compression is adopted as the compression method, character strings that have been processed so far are assigned unique codes and stored in the form of a dictionary. When new character strings are input, they are compared with the existing content of the dictionary. If any character strings in the input data match the coded character strings in the dictionary, they are replaced with the corresponding dictionary codes. All unmatched input character strings are assigned new codes and entered into the dictionary. In this manner, input character string data are entered successively into the dictionary, and all data that match the existing string data are replaced with the matching codes for data compression.

The output of the compander 21 is sent to the IF/ECC controller 22, which in its control operation, places the received compander 21 output temporarily into a buffer memory 23. The data stored in the buffer memory 23 are ultimately processed under control of the IF/ECC controller 22 in units of a fixed length equivalent to 40 tracks of the magnetic tape called a group. The resulting data are subjected to an ECC formatting process.

The ECC formatting process involves supplementing write data (data to be written) with ECC (error-correcting code) and modulating the coded data in a manner complying with magnetic recording. The processed data are fed to the RF processor 19.

Given the write data, the RF processor 19 generates write signals by submitting the data to such processes as amplification and write equalizing and sends the generated write signals to the write heads 12A and 12B. The write heads 12A and 12B supplied with the write signals write the data to the magnetic tape 3.

What follows is a brief description of a data read operation. Recorded data are read from the magnetic tape 3 by the read heads 13A and 13B as RF read signals. The read output is subjected to processes such as read equalizing, read clock generation, binarization, and decoding (e.g., Viterbi decoding) by the RF processor 19.

The signals thus read out are fed to the IF/ECC controller 22 first for error correction. After being placed temporarily in the buffer memory 23, the processed data are read therefrom in a suitably timed manner and sent to the compander 21.

If the system controller 15 determines that the data have been compressed, the compander 21 expands the data accordingly; if the system controller 15 finds that the data are not compressed, then the compander 21 allows the data to be output unmodified. The output data from the compander 21 are output to the host computer 40 as reproduced data via the SCSI buffer controller 26 and the SCSI interface 20.

FIG. 1 also shows the remote memory chip 4 housed in the tape cassette 1. When the tape cassette 1 is loaded into the tape streamer drive, the remote memory chip 4 enters into a state of readiness to exchange data with the system controller 15 in a noncontact manner via the remote memory interface 30.

Figure 2:
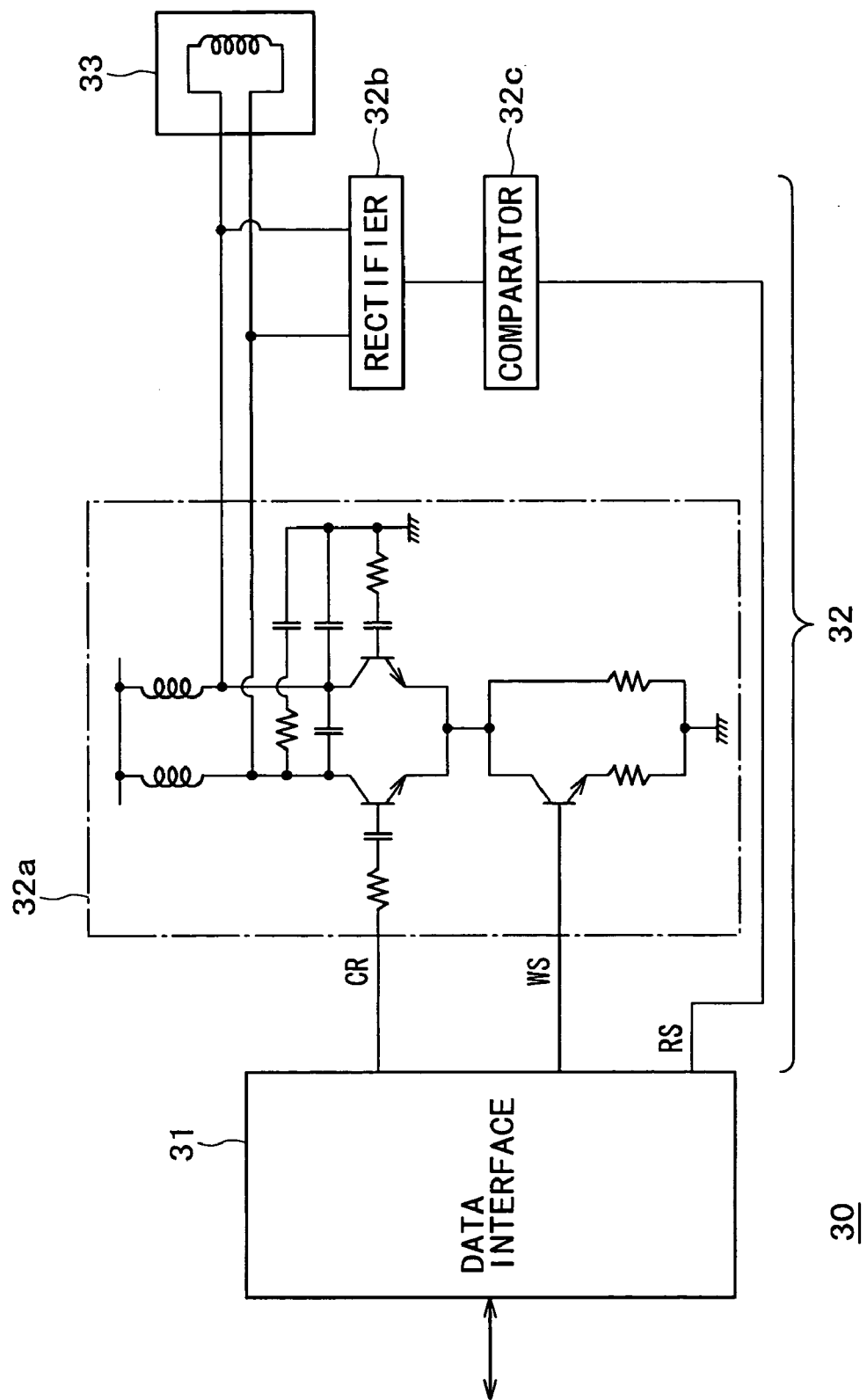
FIG. 2 is a block diagram of a remote memory interface included in the inventive tape streamer drive.

FIG. 2 depicts a typical structure of the remote memory interface 30. A data interface 31 is provided to permit data exchanges with the system controller 15. As will be discussed later, a data transfer to the remote memory chip 4 takes place in the form of a command from the apparatus and an acknowledgment of that command by the remote memory chip 4. When the system controller 15 issues a command to the remote memory chip 4, the data interface 31 receives command data and a clock signal from the SCSI buffer controller 26. In keeping with the clock, the data interface 31 feeds the command data to a RF interface 32. The data interface 31 also supplies a carrier frequency CR (13 MHz) to the RF interface 32.

As shown in FIG. 2, the RF interface 32 includes a RF modulator/amplifier 32a that modulates in amplitude (100 kHz) the command (outgoing data) WS and superposes the modulated command onto the carrier frequency CR. After the modulation and amplification, the resulting signal is sent to an antenna 33.

The RF modulator/amplifier 32a causes the command data to be transmitted wirelessly from the antenna 33 to the antenna 5 inside the tape cassette 1. As discussed above with reference to FIG. 5, the circuitry in the tape cassette 1 is switched on upon receipt of the command data by the antenna 5. In keeping with what is designated by the command, the controller 4c carries out the corresponding operation. Illustratively, the data transmitted along with a write command are written to the EEPROM 4d under control of the controller 4c.

When the remote memory interface 30 issues a command, the remote memory chip 4 acknowledges it. More specifically, the controller 4c of the remote memory chip 4 causes the RF processor 4b to modulate and amplify acknowledgment data before transmitting the acknowledgment from the antenna 5.

Upon receipt of the acknowledgment by the antenna 33, the received signal is rectified by a rectifier 32b before being demodulated by a comparator 32c into data. The demodulated data are sent through the data interface 31 to the system controller 15. Illustratively, if the system controller 15 issues a read command to the remote memory chip 4, the remote memory chip 4 returns data retrieved from the EEPROM 4d along with a code acknowledging the received command. The acknowledgment code and the retrieved data are received and demodulated by the remote memory interface 30 before being forwarded to the system controller 15.

As described, the tape streamer drive 10 using the remote memory interface 30 can gain access in noncontact fashion to the remote memory chip 4 inside the tape cassette 1. In the noncontact data exchanges above, the data are modulated in amplitude at 100 kHz and super inposed onto the 13-MHz carrier. The initial data are packetized for the exchange. More specifically, the data in the form of a command and an acknowledgment are supplemented with a header, parity code and other necessary information before being packetized. The packetized data are subjected first to code conversion and then to modulation, whereby stable RF signals are generated for transmission and reception. The techniques for implementing the noncontact interface described above were submitted earlier by this applicant and were granted a patent (Japanese Patent No. 2550931).

A SRAM 24 and a flash ROM 25 shown in FIG. 1 hold data for use by the system controller 15 in various processes. For example, the flash ROM 25 retains constants used for control purposes. The SRAM 24 is utilized as a work memory or as a memory that accommodates data from the MIC (remote memory chip 4 or contact type memory 104), data to be written to the MIC, mode data set in units of a tape cassette, and various flag data. The SRAM 24 also serves to let the stored data therein be operated on.

The flash ROM 25 provided as firmware retains such diverse items of information as data write/read retry counts, write current values for use by the RF processor 19, and equalizer characteristics. When the tape cassette is loaded, the tape streamer drive 10 can execute controls based on the settings held in this firmware.

The SRAM 24 and flash ROM 25 may be furnished as internal memories of a microcomputer constituting the system controller 15. Part of the areas in the buffer memory 23 may alternatively be used as a work memory.

As shown in FIG. 1, the tape streamer drive 10 and the host computer 40 communicate information with each other through the SCSI interface 20 in the manner described above. The system controller 15 receives communications from the host computer 40 through the use of SCSI commands. The SCSI interface may be replaced alternatively by some other suitable interfacing arrangements, such as an IEEE 1394 interface.

Where the tape cassette 1 incorporating the contact type memory 104 shown in FIG. 3B is employed as the target tape cassette, the tape streamer drive 10 is provided with a connector block 45 that writes and reads data to and from the memory 104. The connector block 45 is shaped to fit the terminal block 106 shown in FIG. 4. When coupled to the terminal block 106, the connector block 45 electrically connects the five terminals 105A, 105B, 105C, 105D and 105E of the contact type memory 104 to the system controller 15 (i.e., to a memory connection port of the system controller).

When the electrical connection is established, the system controller 15 can access the contact type memory 104 of the loaded tape cassette 1 through the connector block 45 and the terminal block 106. If the connector block 45 and the terminal block 106 are poorly connected, the loading motor 14E may drive the loading mechanism to slightly shift the tape cassette 1 from its loaded position. Such readjustments are carried out as needed to establish proper physical contacts between the two blocks.

4. Magnetic Tape Format

What follows is a general description of a data format along the magnetic tape 3 in the tape cassette 1 to and from which the tape streamer drive 10 writes and reads data.

FIGS. 6A through 6D illustrate a typical structure of data recorded on the magnetic tape 3. FIG. 6A schematically shows a single magnetic tape 3. With this embodiment of the invention, each magnetic tape 3 may be divided into partitions for use on a partition-by-partition basis as depicted in FIG. 6A. Up to 256 partitions may be formed per tape and managed using partition numbers (partitions #0, #1, #2, etc.).

With this embodiment, data can be written and read to and from each partition independently of the other partitions. Illustratively, in a single partition depicted in FIG. 6B, data are shown recorded in units of a fixed length called a group indicated in FIG. 6C. In other words, data are written to the magnetic tape 3 in groups.

One group is equivalent to a data amount of 20 frames. One frame is formed by two tracks, as shown in FIG. 6D. The two tracks constituting each frame are a plus azimuth track and a minus azimuth track contiguous to each other. One group is thus made up of 40 tracks.

Figure 7A:
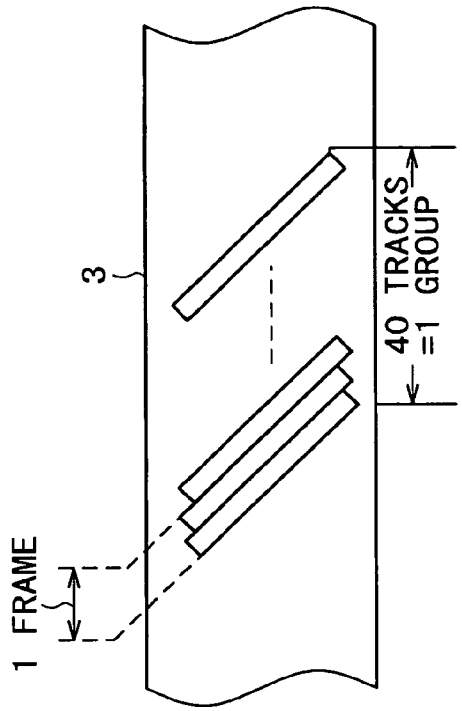
FIGS. 7A, 7B and 7C are schematic views depicting a data structure of a single track.
Figure 7B:
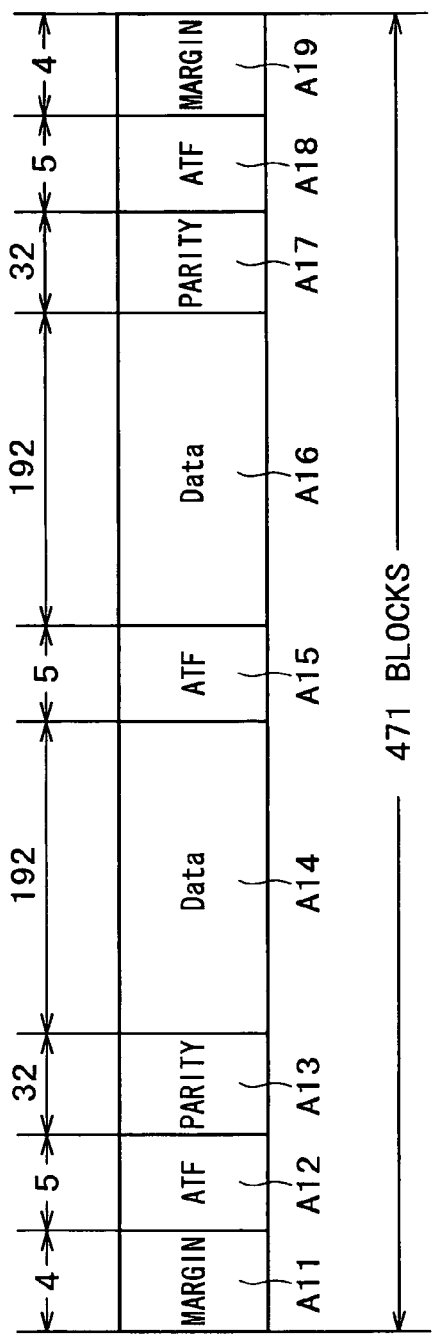

The single-track data structure in FIG. 6D is detailed in FIGS. 7A and 7B. FIG. 7A shows a data structure per block. One block is made up of a one-byte SYNC data area A1 in the leftmost position, followed by a six-byte ID data area A2 for use in searches, a two-byte parity area A3 for ID data error correction, and a 64-byte data area A4, in that order.

The data per track shown in FIG. 7B are composed of 471 blocks in total. Each track has four-block margin areas A11 and A19 at both ends. The margin areas A11 and A19 are followed and preceded respectively by ATF areas A12 and A18 for tracking control. The AFT areas A12 and A18 are followed and preceded respectively by parity areas A13 and A17. Each parity area is formed by 32 blocks.

Figure 7C:
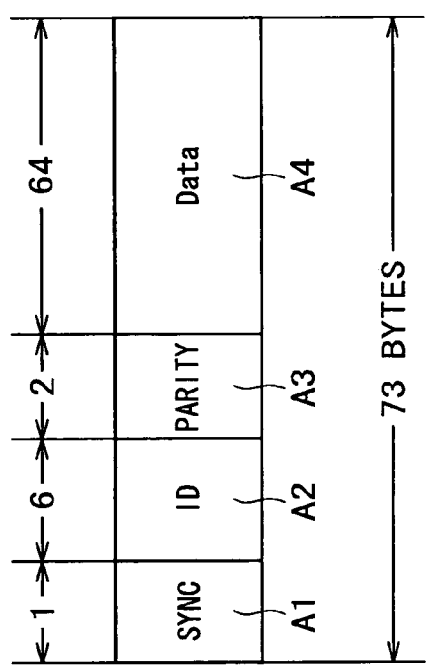

In the middle of a track is disposed an ATF area A15. The ATF areas A13, A15 and A18 are made up of five blocks each. A 192-block data area A14 is formed between the parity areas A13 and the ATF area A15, and another 192-block data area A16 is formed between the ATF area A15 and the parity area A17. Of the 471 blocks making up a single track, 384 blocks constitute the data areas A14 and A16 (192×2=384 blocks). One group composed of 40 tracks (=20 frames), as described above, is physically recorded on the magnetic tape 3, as illustrated in FIG. 7C.

The magnetic tape 3 discussed above with reference to FIGS. 6A through 7C has data recorded thereon in an area structure depicted in FIGS. 8A, 8B and 8C. This representative structure is assumed to have N partitions numbered from #0 to #N-1.

As shown in FIG. 8A, the top of the magnetic tape is physically furnished with a leader tape, followed by a device area for use in the loading and unloading of the tape cassette. The beginning of the device area is called a PBOT (physical beginning of tape). The device area is followed by a reference area with regard to partition #0 and a system area that holds a tape use history and related data (the reference area and the system area are collectively called the system area hereunder). The system area is followed by a data area. The beginning of the system area is called an LBOT (logical beginning of tape).

The system area, as shown magnified in FIG. 8C, includes a reference area, a position tolerance band No. 1, a system preamble, a system log, a system postamble, a position tolerance band No. 2, and a vender group preamble.

The data area subsequent to the system area is shown magnified in FIG. 8B. As illustrated, at the top of the data area is written a vender group indicating information about the vender that first created and supplied data. The vender group is followed by a series of groups each structured as illustrated in FIG. 6C. In this example, group 1 through group (n) are shown to be formed consecutively. The last group (n) is followed by an amble frame.

Subsequent to the data area is an EOD (end of data) area indicating the end of the data area for the partition in question, as shown in FIG. 8A. If there were only one partition, the END of that partition #0 would represent an LEOT (logical end of tape). Since there are N partitions in this case, an optional device area is provided following the EOD of partition #0.

The device area subsequent to the PBOT is an area for use in the loading and unloading of the tape cassette with regard to partition #0. The optional device area at the end of partition #0 serves as an area for use in the loading and unloading of the tape cassette with respect to partition #1.

Partition #1 has the same area structure as partition #0. At the end of partition #1 is formed an optional device area for use in the loading and unloading of the tape cassette with regard to the next partition #2. The subsequent partitions up to partition #(N-1) are each given the same structure.

The last partition #(N-1) has no need for an optional device area and is not furnished therewith. The EOD of partition #(N-1) represents the LEOT (logical end of tape.). A PEOT (physical end of tape) denotes the position where the physical tape or the partition in question physically ends.

5. MIC data structure

The structure of data to be stored in the MIC (remote memory chip 4 or contact type memory 104) will now be described. If the MIC is the remote memory chip 4, data are written to the EEPROM 4d. The contact type memory 104 includes illustratively a nonvolatile memory, not shown, which is equivalent to the EEPROM 4d and which has the data written thereto.

Figure 9:
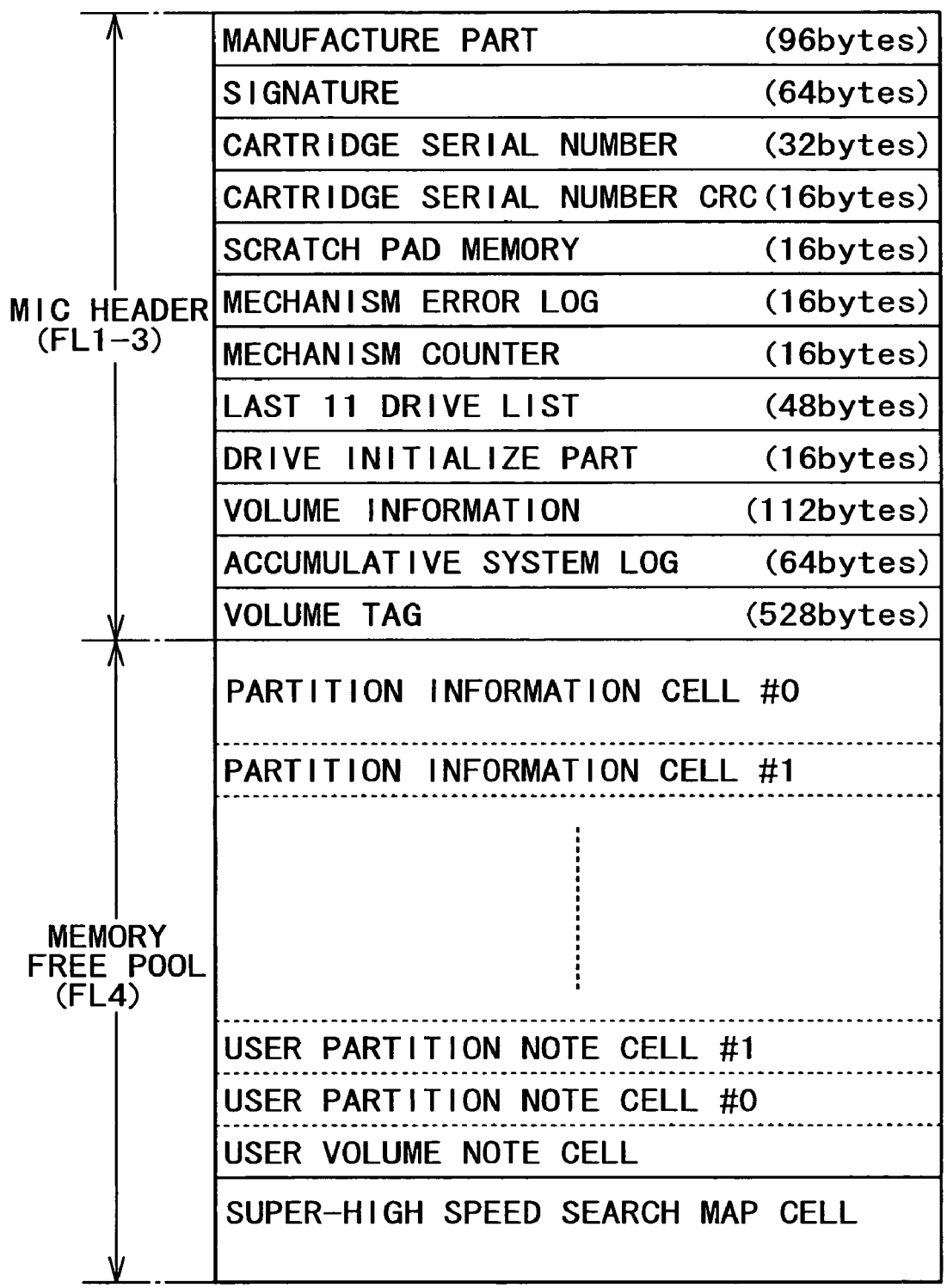
FIG. 9 is an explanatory view indicating a MIC data structure according to the invention.

FIG. 9 schematically shows a typical structure of data held in the MIC. The storage area of the MIC has an MIC header and a memory free pool where diverse kinds of management information are written, such as items of information about manufacture of the tape cassette, tape information in effect upon initialization, and partition-wise information.

The MIC header is topped by a 96-byte manufacture part that primarily retains various items of information about manufacture of the tape cassette in question. The manufacture part is followed by a 64-byte signature, a 32-byte cartridge serial number, a 16-byte cartridge serial number CRC, a 16-byte scratch pad memory, a 16-byte mechanism error log, a 16-byte mechanism counter, and a 48-byte last 11 drive list, in that order. A 16-byte drive initialize part subsequent to the last 11 drive list mainly accommodates information in effect upon initialization.

A 112-byte volume information area subsequent to the drive initialize part holds basic management information about the tape cassette as a whole. The volume information is followed by a 64-byte accumulative system log that stores information about the history accumulated since the manufacture of the tape cassette. At the end of the MIC header is a 528-byte volume tag.

The memory free pool is an area to which management information can be added. This is an area where various items of information are stored or updated as needed in the course of write or read operations. Data are written to the memory free pool in units of data items called collectively a cell.

Where partitions are formed along the magnetic tape 3, partition information cells #0, #1, etc., are written as management information corresponding to the established partitions starting from the top of the memory free pool. That is, there are as many partition information cells written to the memory free pool as the number of partitions formed along the magnetic tape 3.

As shown in FIGS. 8A, 8B and 8C, the system log provided in the system area for each of partitions #0, #1, etc. along the magnetic tape is arranged to hold the same information as that written to the partition information cells #0, #1, etc., in the MIC.

At the end of the memory free pool is written a super-high speed search map cell that constitutes map information for use in super-high speed searches. The super-high speed search map cell is preceded by a user volume note cell and user partition note cells. The user volume note cell is made up of information such as a comment entered by the user about the tape cassette as a whole. The user partition information cells hold such information as comments entered by the user about each of the partitions. These items of information are stored only when designated by the user; their storage in the memory is optional. Any intermediate area where such information is not written is left unused as a memory free pool area for future storage of information.

The manufacture part in the MIC header is structured illustratively as depicted in FIG. 10. The data items making up the manufacture part have their sizes in bytes shown in the rightmost column of FIG. 10. The manufacture part is topped by a one-byte manufacture part checksum that holds checksum information about the data in the manufacture part. This information is provided upon manufacture of this tape cassette.

Real data that constitute the manufacture part range from a MIC type to an offset. An indication "Reserved" denotes an area reserved for future storage of data. The same indication will have the same significance in the description that follows.

The MIC type is a data item that indicates the type of the MIC (remote memory chip 4) actually furnished in this tape cassette.

A MIC manufacture date represents the date (and time) of manufacture of this MIC.

A MIC manufacture line name provides information about the name of the line that manufactured the MIC.

A MIC manufacture plant name furnishes information about the name of the plant that manufactured the MIC.

A MIC manufacturer name gives information about the name of the manufacturer that manufactured the MIC.

A MIC name describes information about the name of the vender that marketed the MIC.

A cassette manufacture date, a cassette manufacture line name, a cassette manufacture plant name, a cassette manufacturer name, and a cassette name are data items that describe the corresponding items of information about the tape cassette.

An OEM customer name holds information about the name of an OEM (original equipment manufacturers) customer.

A physical tape characteristic ID denotes information about physical characteristics of the magnetic tape, such as material, thickness and length of the tape.

A maximum clock frequency provides information about a maximum clock frequency compatible with the MIC in question.

A block size describes information about a data length characteristic of the MIC (remote memory chip 4). This data item represents the data length in units of which data are transmitted at one time through the remote memory interface 30 and the RF interface 32.

A MIC capacity denotes information about the storage capacity of this MIC (remote memory chip 4).

A write protect top address represents the start address of a write-protect area allocated as part of the MIC.

A write protect count indicates the number of bytes in the write-protect area. That is, the write-protect area is allocated in a manner ranging from the start address designated by the write protect top address to the address indicated by this write protect count.

An application ID, shown as a one-byte data item, provides the ID of the application which, in this context, means a tape cassette type.

A two-byte area following the application ID serves as an offset.

Described below with reference to FIG. 11 is how the drive initialize part in the MIC header is typically structured. The data items making up the drive initialize part have their sizes in bytes indicated in the rightmost column of FIG. 11.

The drive initialize part is topped by a drive initialize part checksum that holds checksum information about the data in the drive initialize part.

Real data that constitute the drive initialize part range from a MIC logical format type to a free pool bottom address.

The MIC logical format type contains an identifier identifying the format type of the magnetic tape 3. Upon shipment from the factory, the MIC logical format type is set with an identifier indicating this is a virgin (i.e., unformatted) tape cassette.

A super-high speed search map pointer points to the start address of a super-high speed search map cell shown in FIG. 9.

A user volume note cell pointer denotes the start address of the user volume note cell in FIG. 9, i.e., a storage area of the tape cassette to and from which the user may write and read data as desired through SCSI arrangements.

A user partition note cell pointer represents the start address of the user partition note cell or cells in FIG. 9, i.e., a storage area or areas to and from which the user may write and read data as desired through SCSI arrangements. Whereas, there may exist a plurality of user partition note cells, the single user partition note cell pointer points to the start address of the first user partition note cell.

A partition information cell pointer denotes the start address of partition information cell #0 in FIG. 9. There are as many items of partition information written to the memory free pool as the number of partitions formed along the magnetic tape 3. All partition information cells #0 through #N are linked by pointers. That is, the partition information cell pointer serves as a root pointer indicating the address of partition #0. The pointers of the ensuing partition information cells are each included in the preceding partition information cell.

As described, the pointers (super-high speed map pointer, user volume note cell pointer, user partition note cell pointer, and partition information cell pointer) are used to manage the data locations in the memory free pool (a field FL4).

A volume attribute flag is a one-byte flag that serves as a logical write-protect tab used by the MIC 4.

A free pool top address and a free pool bottom address denote the current start address and end address of the memory free pool in the field FL4. Because the memory free pool as a storage area varies in locations depending on the writing and erasure of partition information and user partition notes, the free pool top address and the free pool bottom address are updated accordingly.

FIG. 12 lists definitions of the MIC logical format type included in the drive initialize part shown in FIG. 11. First, tape formats handled by the tape streamer drive 10 embodying the invention are described below preparatory to explaining the definitions of FIG. 12. There are three tape formats stipulated at present: AIT- 1; AIT-2; and AIT-3. Where the AIT-1 format is in effect, the MIC attached to the tape cassette is to be the contact type memory 104 alone; the remote memory chip 4 is not to be provided. Where the AIT-2 format is used, the MIC attached to the tape cassette may be either the contact type memory 104 or the remote memory chip 4. Where the AIT-3 is in force, the MIC attached to the tape cassette is to be the remote memory chip 4 alone; the contact type memory 104 is not to be furnished.

For each of the three formats above, the MIC logical format type is defined as follows:

If the value of the MIC logical format type is set to 0, that means the tape cassette is furnished with the contact type memory 104 and that the magnetic tape 3 inside is unformatted (virgin) with the AIT-1 format in effect (AIT-1 virgin MIC). If the MIC logical format type value is set to 1, that means the magnetic tape 3 has been formatted in accordance with the AIT-1 format (AIT-1 basic MIC logical format type 1).

If the value of the MIC logical format type is set to 10, that means the tape cassette is furnished with the contact type memory 104 and that the magnetic tape 3 inside is unformatted (virgin) with the AIT-2 format in effect (AIT-2 virgin MIC). If the MIC logical format type value is set to 11, that means the tape cassette is provided with the contact type memory 104 and that the magnetic tape 3 inside has been formatted in accordance with the AIT-2 (AIT-2 basic MIC logical format type 1).

If the value of the MIC logical format type is set to 14, that means the tape cassette is furnished with the remote memory chip 4 and that the magnetic tape 3 inside is unformatted (virgin) with the AIT-2 format in effect (AIT-2 virgin remote MIC). If the MIC logical format type value is set to 15, that means the tape cassette is provided with the remote memory chip 4 and that the magnetic tape 3 inside has been formatted in accordance with the AIT-2 (AIT-2 basic remote MIC logical format type 1).

If the value of the MIC logical format type is set to 20, that means the tape cassette is furnished with the remote memory chip 4 and that the magnetic tape 3 inside is unformatted (virgin) with the AIT-3 format in effect (AIT-3 virgin remote MIC). If the MIC logical format type value is set to 21, that means the tape cassette is provided with the remote memory chip 4 and that the magnetic tape 3 inside has been formatted in accordance with the AIT-3 (AIT-3 basic remote MIC logical format type 1).

Of the values 0 through 255, those other than the settings mentioned above are reserved.

As described, the MIC logical format type indicates whether the magnetic tape 3 is formatted or unformatted in keeping with each of the tape formats addressed by the tape streamer drive 10 of this invention. For example, the tape cassette of this invention has its magnetic tape left unformatted upon shipment from the factory; no signal is recorded on the magnetic tape. In conjunction with this unformatted state, the MIC is written with the MIC logical format type value indicating the unformatted state subject to the format type in question, upon shipment from the factory. If, say, the AIT-3 format is in effect, then the MIC is written with the MIC logical format type value of 20.

When the tape cassette is formatted by the tape streamer drive 10, the drive 10 overwrites the MIC logical format type in the MIC with a value denoting a formatted state. If, say, the AIT-3 format is in effect, the MIC logical format type value of 20 is overwritten with 21.

In the drive initialize part including the MIC logical format type, there is no history information to be updated in a manner reflecting the past write and read operations performed on the magnetic tape. For that reason, the drive initialize part is established as a ROM area once the magnetic tape is formatted as described above. If, however, the magnetic tape is reformatted after it was formatted once, then the drive initialize part is updated correspondingly.

Still, the reformatting-leaves intact the MIC logical format type that contains a value designating a formatted state. That is, the MIC logical format type denotes the unformatted state only before the initial formatting; once the formatting is done, the MIC logical format type always contains the value indicative of the formatted state.

6. Data Structure of System Logs on the Magnetic Tape

Figure 13:
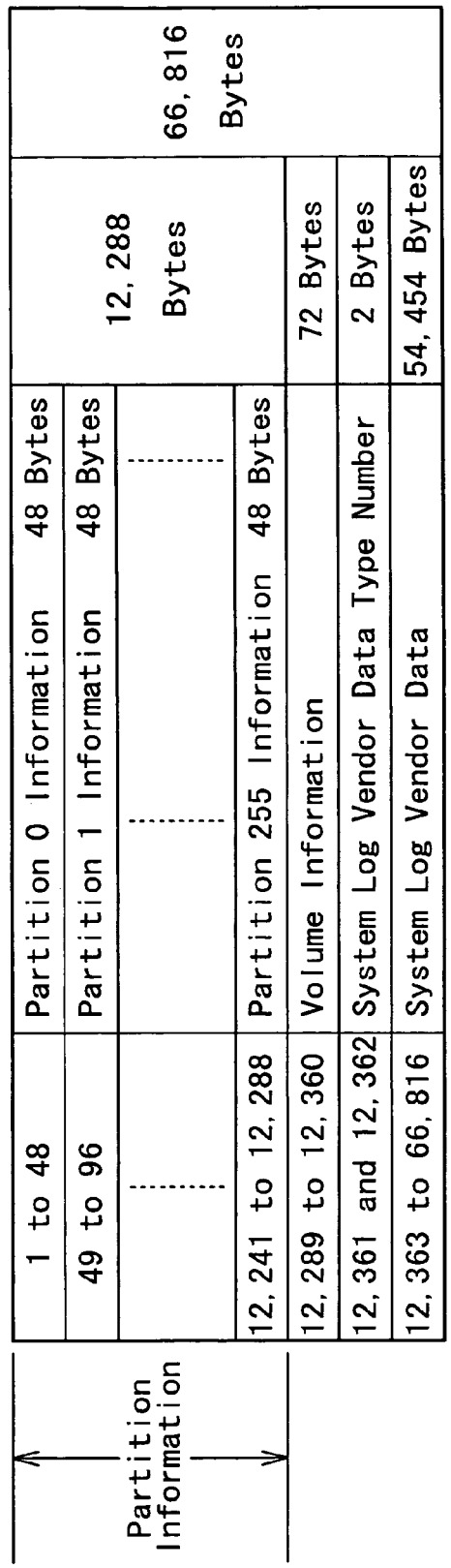
FIG. 13 is an explanatory view showing a typical system log according to the invention.

What follows is a description of the system log written in the system area on the magnetic tape 3. FIGS. 13 and 14 depict typical, overall, system log data structures. The system log shown in each of these figures includes system log vender data, as well as information about the partition to which the system log belongs. The system log vender data are made up of data necessary for the manufacturer (vendor) that manufactured this tape cassette to manage the tape cassette and its MIC and to provide them with the vendor's proprietary utility.

FIG. 13 depicts a data structure of the system log called type 0. In the case of a multiple partition tape format in which a plurality of partitions are allowed to be formed, the system log type 0 represents the structure of the system log furnished in the top partition. In the example of FIG. 8, the system log type constitutes the system log for partition #0. In practice, a system made up of the tape streamer drive and the tape cassette according to this invention may adopt a single partition format involving only one partition formed on the magnetic tape. In this case, the system log also is constituted by the system log type 0 shown in FIG. 13.

FIG. 14 shows a data structure of the system log called type 1. Where the multiple partition tape format is in effect allowing a plurality of partitions to be formed, the system log type 1 represents the structure of the system log furnished in the partition following the top partition and in each of the subsequent partitions.

The system log type 0 in FIG. 13 has total area of 66,816 bytes. The data size of the entire system log is determined in units of frames (see FIG. 6D) on the magnetic tape. In practice, hundreds of frames each taking on the structure of FIG. 13 are written consecutively on the tape to make up the system log. That is, the same system log data structured as shown in FIG. 13 are written may times over the constitute the system log area on the magnetic tape. This also applies to the system log type 1 depicted in FIG. 14.

In the system log type 0, a 12,228-byte area ranging from byte location 1 to byte location 12,228 makes up a partition information area that stores information about the partitions formed along the magnetic tape. As discussed above with reference to FIG. 6, the system embodying this invention may establish up to 256 partitions in a multiple partition format set-up. In that setup, the partition information area is divided into 48-byte areas from byte location 1 onward, i.e., a partition 0 information are through a partition 255 information area. The partition 0 information area through the partition 255 information area each accommodate information regarding each of partitions #0 through #255. In a single partition format setup with only one allocated on the magnetic tape, only the partition 0 information area ranging from byte location 1 to byte location 48 is used as the partition information area.

A 72-byte area ranging from byte location 12,289 to byte location 12,360 subsequent to the partition information constitutes a volume information area. The volume information includes diverse kinds of information about the entire tape cassette.

The volume information is followed by a two-byte, system log vendor data type number area (byte locations 12,361 through 12,362) and a 54,454-byte system vendor data area (byte locations 12,363 through 66,816). A value in the system log vendor data type number area indicates the data content to be stored into the system log vendor data area.

FIG. 14 shows the structure of the system log type 1. As indicated, the system log type 1 as a whole makes up a 66,816-byte area, the same as the system log type 0. The data size of the entire system log type 1 is determined in units of frames on the magnetic tape. Hundreds of frames are written consecutively on the tape to make up the system log.

In the system log type 1, partition information is constituted by 512 consecutive partition N information areas of 48 bytes each, ranging from byte location 1 to byte location 24,576. Each of the partition N information areas accommodates relevant information about the corresponding partition.

The partition information is followed by a two-byte, system log vendor data type number (byte locations 24,577 through 24,578) and a 42,238-byte system log vendor data area (byte locations 24,579 through 66,816). In this case, as in the case of the system log type 0, the value set in the system log vendor data type number area indicates the data content to be stored into the system log vendor data area.

As shown in FIG. 14, the system log type 1 does not have volume information. The absence is attributable simply to a particular formatting scheme used for this example. Alternatively, the system log type 1 may be formatted to accommodate a volume information area as well.

7. Fraud Preventing Measures

In operation, the tape streamer drive 10 of this embodiment takes measures against fraudulent uses of the system committed illustratively through illicit replacement of the MIC. The countermeasures are based on the content (value) of the MIC logical format type held in the drive initialize part of the MIC discussed above with reference to FIGS. 11 and 12. Preventing abuses of the system benefits the legitimate user through the protection of data recorded on the magnetic tape from getting deliberately destroyed or otherwise corrupted.

These fraudulent cases are circumvented by the tape streamer drive 10 illustratively carrying out the steps in the flowchart of FIG. 15. Specifically, the process in FIG. 15 is performed by the system controller 15 in the tape streamer drive 10.

In step S101, the system controller 15 first waits for a tape cassette (cartridge) to be loaded into the tape streamer drive 10. When the tape cassette is found to have been loaded, the system controller 15 goes to step S102.

If the loaded tape cassette has an MIC, the tape streamer drive 10 can gain access to that MIC. If the MIC is a remote memory chip 4, that chip can be accessed via the remote memory interface 30; if the MIC turns out to be a contact type memory 104, then the memory may be accessed through the connector block 45.

In step S102, a MIC check is carried out as one of the sequences that are executed upon loading of the tape cassette. The MIC check involves determining whether the MIC physically exists inside the loaded tape cassette. If the physical presence of the MIC is ascertained, then a check is made on the logical consistency of the data recorded in the MIC.

The check on the physical presence of the MIC is accomplished by determining whether communication is established with the MIC. Illustratively, the tape streamer drive 10 may transmit a predetermined command to the MIC in an attempt to gain access thereto. When a response to the command is received from the MIC, that response confirms the physical existence of the MIC. If the MIC is a contact type memory, the system controller 15 establishes an electrical connection with the MIC through the connector block 45, which typically involves potential changes. Detecting such variations in potential verifies the physical presence of the MIC.

The logical consistency check on the stored data in the MIC is performed by accessing the data area in the MIC to see whether the data content in that area has a format compatible with the system of this embodiment. If the format is found compatible with the system, that means the logical consistency of the MIC is ascertained; if the format is found incompatible with the system, the logical consistency of the data in the MIC cannot be confirmed.

In step S103, the system controller 15 determines whether the MIC check in the preceding step S102 revealed that the MIC exists. The result of the check in step S103 is affirmative only if two conditions are met at the same time: the MIC must physically exist; and the logical consistency of the data in the MIC must be verified. If either or both of the two conditions are not satisfied, the result of the check in step S103 is negative.

If the physical presence of the MIC has led to the affirmative result of the check in step S103, steps S104 and S105 are carried out successively. These are sequence processes to be executed upon loading of the tape cassette.

In step S104, the system controller 15 reads data from the MIC and places them illustratively into the SRAM 24. The data read at this point from the MIC are typically structured as shown in FIG. 9.

Although not shown as a control process here, the magnetic tape is loaded following the earlier loading of the tape cassette. The loaded tape is run until it is set to a position permitting access to the system log on the tape for log data retrieval. In step S105, at the time the access to the system log area on the magnetic tape is completed, the system log data are read from the tape and placed into the SRAM 24.

When the above sequences are finished, the SRAM 24 of the tape streamer drive 10 holds two kinds of data: data from the MIC housed in the loaded tape cassette; and data from the system log recorded on the magnetic tape.

When the MIC-held data from the tape cassette and the system log data from the magnetic tape have been both retrieved and placed into the SRAM 24, step S106 is reached. In step S106, the system controller 15 checks the currently held system log data from the magnetic tape to determine whether the system log has a logical data structure based on a stipulated format.

If in step S106 the system log is found to have the logical data structure conforming to the format, step S107 is reached. The affirmative result of the check in step S106 means that the magnetic tape has been properly formatted in accordance with the stipulated format.

In step S107, the system controller 15 references the MIC logical format type in the drive initialize part from among the data read earlier from the MIC and retained in the SRAM 24 in step S104. In step S108, a check is made to see if the value of the MIC logical format type designates an unformatted (virgin) state. The check in step S108 is intended to detect an illegitimate tape cassette.

If the result of the check in step S108 is affirmative, that means the MIC logical format type from the MIC indicates the unformatted state despite the fact that earlier in step S106 the magnetic tape was found to be formatted in keeping with the stipulated format type. That is, there is an inconsistency between the format state (formatted or unformatted) actually detected from the magnetic tape on the one hand and the format state designated by a data item from the MIC on the other hand.

As mentioned above, the drive initialize part including the MIC logical format type in the MIC is established as a ROM area once the magnetic tape is formatted. The tape streamer drive 10 will not rewrite this area during its normal operations. The inconsistency above strongly suggests the possibility that the original MIC was removed from the tape cassette with its magnetic tape formatted and has been replaced by an illegitimate memory.

In that case, step S108 is followed by step S119 in which a sequence process corresponding to an illegitimate cartridge (corrupted tape cassette) is carried out. The sequence process involves illustratively establishing a mode that disables the tape streamer drive 10 in both write and read operations. The user then has no choice but to have the loaded tape cassette ejected from the drive.

With the above mode established, it is impossible for the tape streamer drive 10 to write or read data to or from the illegitimate tape cassette whose original MIC has been tampered with. Data can be neither obtained from nor falsified or destroyed on the magnetic data in an illicit manner.

For example, suppose that a malicious user substitutes an illicit memory for the original MIC of a WORM feature-equipped tape cassette (WORM cartridge) containing a formatted magnetic tape in order to present the magnetic tape falsely as an unformatted tape. In such a case, step S119 is reached. In this step, data can be neither written nor read to or from the magnetic tape in the tape cassette. All contents legitimately recorded so far on the magnetic tape are thus protected.

If the result of the check in step S108 is negative, that means the MIC logical format type from the MIC indicates that the magnetic tape is formatted in compliance with the stipulated format type. That is in line with the fact that earlier in step S106 the magnetic tape was found to be formatted in keeping with the stipulated format type. There is consistency between the format state actually detected from the magnetic tape on the one hand and the format state retained in the MIC on the other hand. This means the loaded tape cassette is a legitimate cassette with its magnetic tape formatted as stipulated.

If in step S108 the result of the check is negative and no abuse is detected, step S122 is reached. In step S122, a sequence process corresponding to the actual format type (and cartridge type) is carried out. For example, in the case of a normal cartridge subject to the AIT-3 format type, appropriate parameters are set corresponding to the AIT-3 format before the magnetic tape is run to reach a target tape position for the upcoming data write or read operation and for subsequent write or read operations, if such operations apply. In the case of the above-mentioned WORM feature-equipped tape cassette, the tape streamer drive 10 cancels any command to overwrite the recorded areas on the tape with new data. What can only be done here is to write data once to unrecorded areas on the magnetic tape and to read data from the recorded areas on the tape.

If the result of the check in step S106 is negative because the system log data from the magnetic tape are not found to have the logical data structure in compliance with the stipulated format, then step S109 is reached. In step S109, a check is made to determine whether the amplitude of a reproduced signal is obtained as a result of an attempt to access the magnetic tape 3 and read data therefrom. Alternatively, the actual attempt to access the magnetic tape 3 and read data therefrom in step S109 may be replaced by a reference to data retrieved earlier. More specifically, the check on the reproduced signal in step S109 may be performed by referring to reproduced signal state information found in the retained data read from the magnetic tape 3 earlier in step S105. The alternative reference to the retained data also applies to a reproduced signal check to be carried out later in step S117.

In step S110, a check is made to determine whether the reproduced signal is absent on the basis of the reproduced signal check in step S109. If the result of the check in step S110 is affirmative (i.e., if the reproduced signal is absent), that means the magnetic tape has yet to be formatted.

In step S111, as in the earlier step S107, a reference is made to the value of the MIC logical format type. In step S112, a check is made to determine whether the referenced value designates the unformatted (virgin) state of the magnetic tape. If the result of the check in step S112 is negative (i.e., if the magnetic tape is found to be formatted), that is inconsistent with the affirmative result of the check earlier in step S110 (the magnetic tape was found to be unformatted). This arouses the suspicion that the tape cassette may have been tampered with (e.g., the MIC has been replaced). In that case, the above-described step S119 is reached and the sequence process corresponding to the illegitimate cartridge is carried out.

If the result of the check in step S112 is affirmative (i.e., if the magnetic tape is unformatted), that is consistent with the result of the earlier check in step S110 (the magnetic tape was found to be unformatted). In this case, step S120 is reached in which a sequence corresponding to a blank tape (i.e., unformatted magnetic tape) is carried out.

For example, in step S120, the tape streamer drive 10 signals to the relevant application on the host computer 40 that the magnetic tape in the tape cassette is unformatted. Given the signal, the host computer 40 notifies the user through the user interface that the magnetic tape is a blank tape. If the user illustratively instructs the magnetic tape to be formatted, the host computer 40 sends to the tape streamer drive 10 a command for formatting the tape. In response to the command, the tape streamer drive 10 formats the magnetic tape.

If the result of the check in step S110 is negative following the attempt to read data from the magnetic tape (i.e., if the reproduced signal is obtained), then step S113 is reached. In step S113, as in step S111, a reference is made to the value of the MIC logical format type. In step S114, a check is made to determine whether the referenced value indicates the unformatted (virgin) state of the magnetic tape.

If the result of the check in step S114 is negative indicating that the magnetic tape has been formatted, the following can be deduced: earlier, in step S106, the system log from the magnetic tape was not found to have the stipulated format. In the earlier step S110, the reproduced signal was found to be obtained from the magnetic tape. That means there are some signals recorded on the magnetic tape. In other words, the magnetic tape has been formatted in keeping with some format type. Since the existence of the MIC was confirmed in step S103 in addition to the MIC logical format type indicating the formatted state of the magnetic tape, it is presumed that the magnetic tape has been formatted in accordance with a format type that can be handled by the tape streamer drive 10. All things considered, it is highly likely that the magnetic tape has been formatted in keeping with a format type compatible with the tape streamer drive 10 but a write error or some other irregularities at the time of formatting prevented signals from getting recorded correctly to the magnetic tape.

If the result of the check in step S114 is negative, then the system controller 15 goes to step S121 and performs a sequence process corresponding to a tape cassette with its magnetic tape formatted defectively. This process is similar to that addressing the blank tape in step S120 and is designed to rectify the tape format.

If the result of the check in step S114 is affirmative, with the MIC logical format type designating the unformatted (virgin) state of the magnetic tape, then the following can be deduced: earlier, in step S103, the presence of the MIC was confirmed. In step S106, the system log from the magnetic tape was found to indicate that the tape format is not the stipulated format. In step S110, the reproduced signal was detected from the magnetic tape. These findings lead to the deduction that the magnetic tape has been formatted in accordance with a format type that can be handled by the tape streamer drive 10. If no tampering with the MIC is detected, with the MIC logical format type indicating the formatted state, the magnetic tape is presumed to be formatted simply in a faulty manner (hence, step S114 followed by step S121).

If the MIC logical format type read from the magnetic tape indicates the unformatted (virgin) state, that could mean the MIC has been illicitly replaced on the tape cassette having a defective tape format. Thus, if the result of the check in step S114 is affirmative, then the above-described step S119 is reached in which the sequence process corresponding to the illegitimate cartridge is carried out.

If the result of the check earlier in step S103 is negative, with the absence of the MIC on the tape cassette verified, step S115 is reached. In step S115, as in step S105, at the time the access to the system log area on the magnetic tape is completed, the system log data are read from the tape and placed into the SRAM 24. In step S116, as in step S106, the system controller 15 checks the currently held system log from the magnetic tape to determine whether the system log has the logical data structure based on the stipulated format.

If the result of the check in step S116 is affirmative, that means the system log from the magnetic tape confirms the properly formatted state of the tape although the presence of the MIC is not verified. This signifies one of two things: either the loaded tape cassette is originally of an MIC-free format type, or the tape cassette is equipped with a MIC that is faulty and currently incommunicable.

In either case, it is still possible normally to reference the management information in the system area on the magnetic tape for access (write or read) to the tape. Here, too, the normal sequence process corresponding to the format type is carried out as discussed above with regard to step S122.

It might happen that the result of the check in step S116 turns out to be negative, with the system log from the magnetic tape not confirming the presence of the logical data structure in compliance with the stipulated format. In that case, step S116 is followed by steps S117 and S118, in that order.

In steps S117 and S118, as in steps S109 and S110, an attempt is made to read data from the magnetic tape to determine whether a reproduced signal is acquired therefrom. If the result of the check in step S118 is affirmative (i.e., reproduced signal is absent), then it is determined that the tape cassette has an unformatted magnetic tape and is not furnished with an MIC. In this case, step S120 is reached in which the sequence process corresponding to the blank tape is carried out.

If the result of the check in step S118 is negative (i.e., reproduced signal is acquired), then it is determined that the tape cassette has its magnetic tape defectively formatted and is not provided with a MIC. In this case, as shown in FIG. 15, step S121 is reached in which the sequence process corresponding to the defectively formatted tape cassette is carried out.

As can been understood from the process in FIG. 15 discussed above, this embodiment is designed to check the loaded tape cassette for anything illegal, such as an illicitly replaced MIC. The check is based both on the MIC logical format type held in the MIC and on the result of an actual read operation executed on the magnetic tape.

The MIC logical format type constitutes an item of the management information held in the MIC, the item designating the format state (formatted or unformatted) of the magnetic tape. The read operation carried out on the magnetic tape is intended to obtain the system log (management information) from the tape to see whether it has the logical structure conforming to the stipulated format as well as to determine whether a reproduced signal is acquired from the tape. These findings are handled as directly recognized information about the actual format state of the magnetic tape.

In the process of FIG. 15, a check is made on the consistency between the format state indicated by the MIC on the one hand and the format state detected from the magnetic tape on the other hand. In case of an inconsistency, the loaded tape cassette is presumed to be an illegal tape cassette illustratively with its MIC replaced unlawfully.

Conventionally, the MIC logical format type was used simply to designate the format state of the magnetic tape on the part of the MIC. Illustratively, the MIC logical format type was referenced by the tape streamer drive 10 so that the drive 10 would simply find out the format type of the magnetic tape or determine whether the magnetic tape was formatted or unformatted, before proceeding to establish internal settings correspondingly.

This embodiment, by contrast, utilizes the MIC logical format type for fraud prevention as discussed above, taking advantage of the information content designating the formatted or unformatted state of the magnetic tape. The inventive scheme employs only the currently defined management information; there is no need additionally to define more data items to be recorded to the MIC or the magnetic tape for fraud prevention purposes.

In FIG. 15, the check made in step S108 based on the value of the MIC logical format type determines whether the loaded tape cassette is an illegitimate cassette (cartridge) by simply finding out whether the magnetic tape is formatted or unformatted. In practice, however, the check in step S108 may be carried out as follows.

The fact that step S108 has been reached signifies that in the preceding step S106 the format type was recognized on the basis of the system log read from the magnetic tape. That is, the recognition of the format type is attributable to what is recorded on the magnetic tape. The check in step S108 may then involve determining whether two conditions are both met: if there is a match between the MIC logical format type value referenced in step S107 on the one hand and the format type recognized in step S106 on the other hand; and if the magnetic tape is formatted.

If the result of the above check in step S108 is negative, that means the MIC logical format type from the MIC indicates the unformatted state regardless of the format type in effect. In this case, there is an inconsistency between the formatted state of the magnetic tape detected earlier in step S106, as per the stipulated format type on the one hand, and the unformatted state designated by the MIC logical format type on the other hand.

Alternatively, it might happen that whereas the formatted state is designated by the MIC logical format type from the MIC, the format type is different from what was actually recognized of the magnetic tape in step S106. In this case, there also exists an inconsistency between the format type specified by the system log from the magnetic tape on the one hand and the format type designated by the MIC logical format type on the other hand.

In any case, there is a mismatch between the format state (formatted or unformatted, and format type) detected by an actual read operation on the magnetic tape on the one hand and the format state designated by a data item held in the MIC on the other hand. In the cases above, the result of the check in step S108 turns out to be negative (indicated by a parenthesized "NO" (N) for step S108 FIG. 15). Then, step S108 is followed by step S119 in which the sequence process corresponding to the illegitimate cartridge is carried out.

The result of the check in step S108 is affirmative (indicated by a parenthesized "YES" (Y) for step S108 in FIG. 15) only if two conditions are both met: if there is a match between the format type designated by the MIC logical format type value and the format type recognized in step S106; and if the MIC logical format type indicates the unformatted (virgin) state.

Although the description above contains many specificities, these should not be construed as limiting the scope of the invention but as merely providing illustrations of some of the presently preferred embodiments of this invention. For example, the tape format and MIC data structure illustrated and described above may be modified in their details as needed. The tape drive apparatus of this invention is not limited to the tape streamer drive used for data storage; it can also be applied to tape drives for other purposes.

As described, the tape cassette as the recording medium of this invention is equipped with a memory capable of accommodating management information. An item of the management information held in the memory constitutes format state designation information (MIC logical format type) designating the format state (formatted or unformatted) of the magnetic tape.

A check is made on the consistency between the format state designation information read from the memory on the one hand and the magnetic tape format state deduced from an actual read operation performed on the magnetic tape on the other hand. The result of the check is used as the basis for controlling recording and reproduction of data to and from the loaded tape cassette. If there is an inconsistency (a mismatch in format state) between the memory and the magnetic tape, that is interpreted as something fraudulent having been committed on the tape cassette. In such a case, subsequent read and write operations are controlled in such a manner that the use of the illegitimate tape cassette may be inhibited.

That is, according to the invention, the format state designation information currently defined and held in the memory is utilized for the prevention of data falsification or other tampering with the tape cassette. The inventive scheme thus improves security of the tape drive system and enhances its reliability.

What is claimed is:

1. A tape drive apparatus comprising:
tape-oriented recording and/or reproducing means for recording and/or reproducing information to and/or from a magnetic tape housed in a tape cassette furnished as a recording medium, said tape cassette being loaded in the apparatus;
memory accessing means for accessing a memory which is incorporated in said tape cassette furnished as said recording medium and which holds management information for write and/or read operations to and/or from said magnetic tape, said memory accessing means writing and/or reading information to and/or from said memory following the accessing;
information acquiring means for acquiring format state designation information from said memory by causing said memory accessing means to access said memory for information retrieval, said format state designation information designating an unformatted state when said magnetic tape has yet to be formatted, said format state designation information further designating a formatted state once said magnetic tape is formatted; and
operation controlling means which, based at least on specifics of the acquired format state designation information and on a result of a read operation on said magnetic tape by said tape-oriented recording and/or reproducing means, controls a write and/or a read operation on said recording medium.

2. The tape drive apparatus according to claim 1, wherein said operation controlling means determines whether there exists a predetermined logical structure in said management information retrieved as a result of said read operation on said magnetic tape by said tape-oriented recording and/or reproducing means for write and/or read operations to and/or from said magnetic tape.

3. The tape drive apparatus according to claim 1, wherein said operation controlling means determines whether a reproduced signal is obtained as a result of said read operation on said magnetic tape by said tape-oriented recording and/or reproducing means, said read operation retrieving data from a predetermined area of said magnetic tape.

4. A recording and/or reproducing method for use with a tape drive apparatus, the method comprising the steps of:

recording and/or reproducing information to and/or from a magnetic tape housed in a tape cassette furnished as a recording medium, said tape cassette being loaded in the apparatus;

accessing a memory which is incorporated in said tape cassette furnished as said recording medium and which holds management information for write and/or read operations to and/or from said magnetic tape, said memory accessing step writing and/or reading information to and/or from said memory following the accessing;

acquiring format state designation information from said memory by causing said memory accessing step to access said memory for information retrieval, said format state designation information designating an unformatted state when said magnetic tape has yet to be formatted, said format state designation information further designating a formatted state once said magnetic tape is formatted; and controlling a write and/or a read operation on said recording medium based at least on specifics of the acquired format state designation information and on a result of a read operation on said magnetic tape performed in said recording and/or reproducing step.

5. A recording medium furnished as a tape cassette in cartridge for housing a magnetic tape to and/or from which to write and/or read information and a memory for holding management information for managing write and/or read operations to and/or from said magnetic tape;

wherein said memory accommodates format state designation information designating an unformatted state when said magnetic tape has yet to be formatted, said format state designation information further designating a formatted state once said magnetic tape is formatted.

* * * * *